(12) United States Patent
Nilo et al.

(10) Patent No.: US 10,705,713 B2
(45) Date of Patent: Jul. 7, 2020

(54) DRAG AND DROP FOR TOUCHSCREEN DEVICES

(71) Applicant: Apple Inc., Cupertino, CA (US)

(72) Inventors: Bruce D. Nilo, Cupertino, CA (US);
David Rahardja, Sunnyvale, CA (US);
Michael T. Turner, San Jose, CA (US);
Kurt A. Revis, San Francisco, CA (US); Christopher K. Thomas, Sunnyvale, CA (US); Stephen R. Breen, San Jose, CA (US); Tyler M. Fox, Santa Clara, CA (US); Emanuele Rudel, San Francisco, CA (US); Robert D. Boehnke, Cupertino, CA (US); Tom Adriaenssen, Santa Clara, CA (US); James R. Montgomerie, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 15/721,695

(22) Filed: Sep. 29, 2017

(65) Prior Publication Data

US 2018/0335911 A1 Nov. 22, 2018

Related U.S. Application Data

(60) Provisional application No. 62/507,199, filed on May 16, 2017.

(51) Int. Cl.
*G06F 3/048* (2013.01)
*G06F 3/0486* (2013.01)
(Continued)

(52) U.S. Cl.
CPC .......... *G06F 3/0486* (2013.01); *G06F 3/0412* (2013.01); *G06F 3/0416* (2013.01);
(Continued)

(58) Field of Classification Search
CPC .............................. G06F 3/0486; H04L 67/14
See application file for complete search history.

(56) References Cited

U.S. PATENT DOCUMENTS

| 5,581,670 A | 12/1996 | Bier et al. |
| 5,959,625 A | 9/1999 | Betrisey et al. |

(Continued)

FOREIGN PATENT DOCUMENTS

EP 2131271 12/2009

OTHER PUBLICATIONS

International Search Report and Written Opinion from PCT/US2018/028194, dated Sep. 17, 2018, 23 pages.
(Continued)

*Primary Examiner* — Scott T Baderman
*Assistant Examiner* — Mario M Velez-Lopez
(74) *Attorney, Agent, or Firm* — Morgan, Lewis & Bockius LLP

(57) ABSTRACT

A device implementing drag and drop for touchscreen devices may include a processor configured to detect a drag gesture selecting an item in a first application. The processor may be further configured to detect a touch release at an end of the drag gesture for dropping the item in a second application, and send, in response to the detected touch release, a message to the second application, the message including information for a plurality of representations of the item. The processor may be further configured to receive, from the second application, a request for a representation of the item from among the plurality of representations. The processor may be further configured to send, to the first application, the request for the representation of the item. The processor may be further configured to initiate a data transfer of the representation of the item from the first application to the second application.

21 Claims, 18 Drawing Sheets

(51) Int. Cl.
*G06F 3/041* (2006.01)
*G06F 3/0481* (2013.01)
*G06F 3/0482* (2013.01)
*G06F 3/0488* (2013.01)
*G06F 21/62* (2013.01)

(52) U.S. Cl.
CPC ........ *G06F 3/0482* (2013.01); *G06F 3/04817* (2013.01); *G06F 3/04883* (2013.01); *G06F 21/6218* (2013.01); *G06F 2203/04808* (2013.01); *G06F 2221/2137* (2013.01)

(56) References Cited

U.S. PATENT DOCUMENTS

| | | | |
|---|---|---|---|
| 6,061,058 A | 5/2000 | Owens et al. | |
| 7,490,353 B2* | 2/2009 | Kohavi | G06F 21/51 713/189 |
| 7,802,195 B2 | 9/2010 | Saul et al. | |
| 8,190,707 B2* | 5/2012 | Trivedi | H04L 67/36 709/218 |
| 8,850,344 B1* | 9/2014 | Rowlette | G06F 3/0486 715/769 |
| 8,959,446 B2 | 2/2015 | Igeta | |
| 8,966,386 B2 | 2/2015 | Fok et al. | |
| 9,098,183 B2 | 8/2015 | Vonshak et al. | |
| 9,251,155 B1 | 2/2016 | Galimberti | |
| 9,514,205 B1 | 12/2016 | Yazicioglu | |
| 9,606,716 B2 | 3/2017 | Sharifi et al. | |
| 9,864,810 B2 | 1/2018 | Chumbley | |
| 2002/0077823 A1 | 6/2002 | Fox et al. | |
| 2007/0089100 A1 | 4/2007 | Morris et al. | |
| 2007/0157101 A1* | 7/2007 | Indiran | G06F 3/0486 715/769 |
| 2007/0288599 A1 | 12/2007 | Saul et al. | |
| 2008/0092181 A1* | 4/2008 | Britt | H04N 7/1675 725/87 |
| 2008/0134071 A1 | 6/2008 | Keohane | |
| 2009/0096758 A1* | 4/2009 | Hotelling | G06F 3/0416 345/173 |
| 2009/0210811 A1* | 8/2009 | Saul | G06F 3/0486 715/769 |
| 2010/0100855 A1* | 4/2010 | Yoo | G06F 3/0486 715/863 |
| 2010/0175011 A1 | 7/2010 | Song | |
| 2011/0099497 A1 | 4/2011 | Fok et al. | |
| 2012/0066602 A1 | 3/2012 | Chai et al. | |
| 2012/0084689 A1 | 4/2012 | Ledet | |
| 2012/0289290 A1 | 11/2012 | Chae et al. | |
| 2013/0007106 A1 | 1/2013 | Tobin | |
| 2013/0042259 A1 | 2/2013 | Urbach | |
| 2013/0227441 A1* | 8/2013 | Cockcroft | G06F 17/30873 715/760 |
| 2013/0227641 A1* | 8/2013 | White | H04L 63/20 726/1 |
| 2014/0040979 A1* | 2/2014 | Barton | H04L 63/20 726/1 |
| 2014/0331158 A1 | 11/2014 | Hicks et al. | |
| 2014/0372858 A1 | 12/2014 | Campbell | |
| 2015/0242086 A1 | 8/2015 | Mindlin | |
| 2016/0139776 A1 | 5/2016 | Donahue et al. | |
| 2017/0046036 A1* | 2/2017 | Yokota | G06T 11/60 |
| 2017/0193742 A1* | 7/2017 | Lim | G07F 17/322 |
| 2017/0199789 A1 | 7/2017 | Milvaney | |
| 2018/0284956 A1 | 10/2018 | Rommel | |
| 2018/0335911 A1* | 11/2018 | Nilo | G06F 3/0416 |

OTHER PUBLICATIONS

Geier, "How to Keep Your PC Safe With Sandboxing," Jan. 16, 2012, retrieved from https://www.pcworld.com/articles/247416/how_to_keep_your_pc_safe_with_sandboxing.html, 4 pages.

* cited by examiner

DRAG AND DROP FOR TOUCHSCREEN DEVICES

CROSS-REFERENCE TO RELATED APPLICATIONS

The present application claims the benefit of U.S. Provisional Patent Application Ser. No. 62/507,199, entitled "DRAG AND DROP FOR TOUCHSCREEN DEVICES," filed May 16, 2017, which is hereby incorporated herein by reference in its entirety and made part of the present U.S. Utility Patent Application for all purposes.

TECHNICAL FIELD

The present description relates generally to implementing drag and drop functionality on touchscreen electronic devices.

BACKGROUND

Drop and drop gestures enable moving or copying data from a source application to a destination application. For example, a user may drag a representation of a photo from a first application and drop the representation of the photo into a second application. The data corresponding to the photo may then be copied or moved from the first application to the second application in response to the dropping.

BRIEF DESCRIPTION OF THE DRAWINGS

Certain features of the subject technology are set forth in the appended claims. However, for purpose of explanation, several embodiments of the subject technology are set forth in the following figures.

FIG. 41B illustrates a flow diagram of an example process for using a file provider to fulfill a data transfer as part of a drag and drop operation on the electronic device that includes a touchscreen in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides an architecture that enables drag and drop functionality, with security features, on touchscreen electronic devices.

Figure 1:
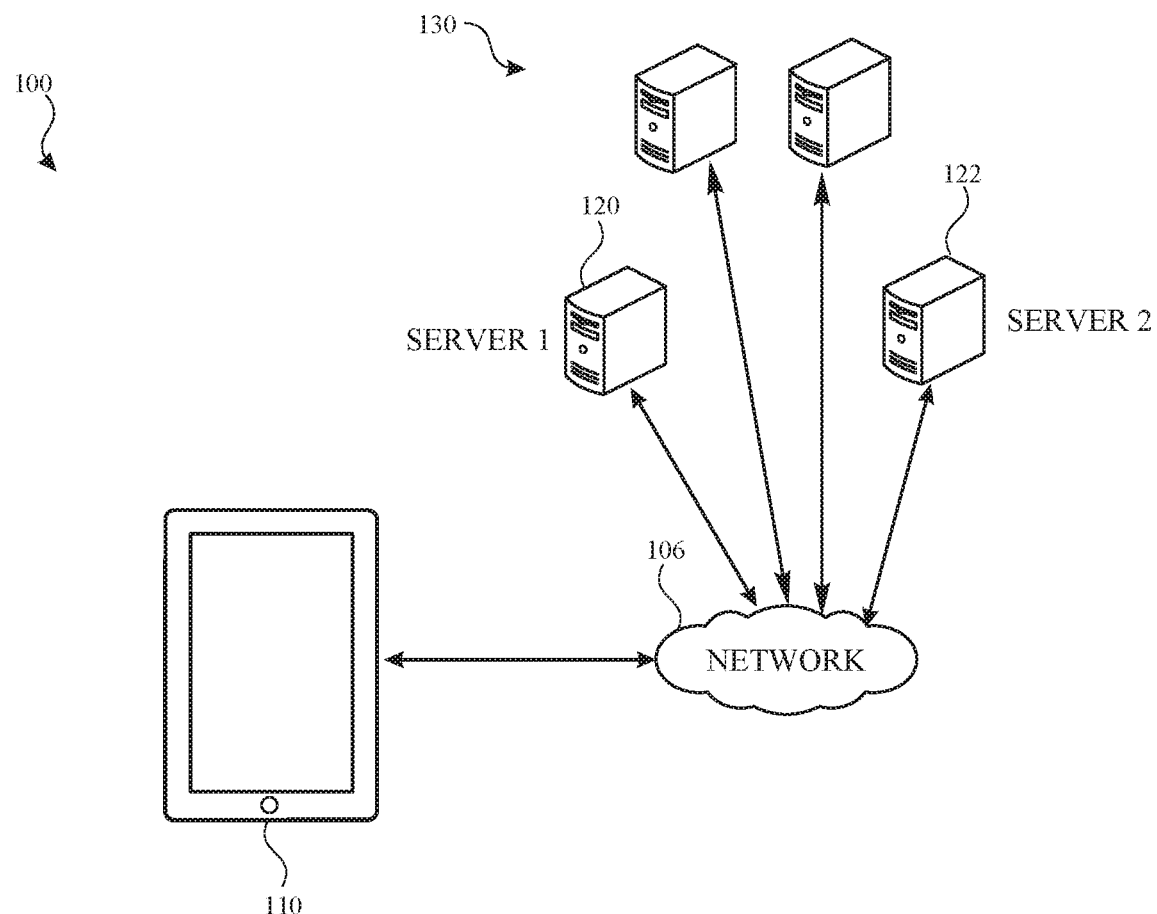
FIG. 1 illustrates an example network environment including an electronic device that may implement the subject system in accordance with one or more implementations.

FIG. 1 illustrates an example network environment 100 including an electronic device 110 that may implement the subject system in accordance with one or more implementations. Not all of the depicted components may be used in all implementations, however and one or more implementations may include additional or different components than those shown in the figure. Variations in the arrangement and type of the components may be made without departing from the spirit or scope of the claims as set forth herein. Additional components different components, or fewer components may be provided.

The network environment 100 includes an electronic device 110, a server 120, and a server 122 in which the server 120 and/or the server 122 may be included in a group of servers 130. The network 106 may communicatively (directly or indirectly) couple, for example, the electronic device 110 with the server 120 and/or the server 122 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, the server 122, and the group of servers 130; however, the network environment 100 may include any number of electronic devices and any number of servers or a data center including multiple servers.

The electronic device 110 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a virtual reality or augmented reality environment. In one or more implementations, the electronic device 110 may include a touchpad. In FIG. 1, by way of example, the electronic device 110 is depicted as a tablet device with a touchscreen. In one or more implementations, the electronic device 110 may be, and/or may include all or part of, the electronic device discussed below with respect to the electronic system discussed below with respect to FIG. 10.

The electronic device 110 may implement the subject system to provide drag and drop functionality via touchscreen. For example, the electronic device 110 may implement the example drag and drop architecture that is discussed further below with respect to FIG. 3. Examples of drag and drop operations performed via touchscreen are discussed further below with respect to FIGS. 2A-2C, FIGS. 2D-2F, FIGS. 2G-2H, FIGS. 2I-2J, FIGS. 2K-2L, FIGS. 6A-6C, 7A-7B, and 8A-8B.

The server 120 and/or the server 122 may be part of a network of computers or the group of servers 130, such as in a cloud computing or data center implementation. The server 120, the server 122, and the group of servers 130 may store data, such as photos, music, text, web pages and/or content provided therein, etc., that may be accessible on the electronic device 110. In one or more implementations, the electronic device 110 may support a drag and drop operation that involves dragging and dropping a representation of a data item that is physically stored on the server 120 or the server 122 or one or more servers from the group of servers 130, such as an image file, text, a sound file, a video file, an application, etc.

Figure 2A:
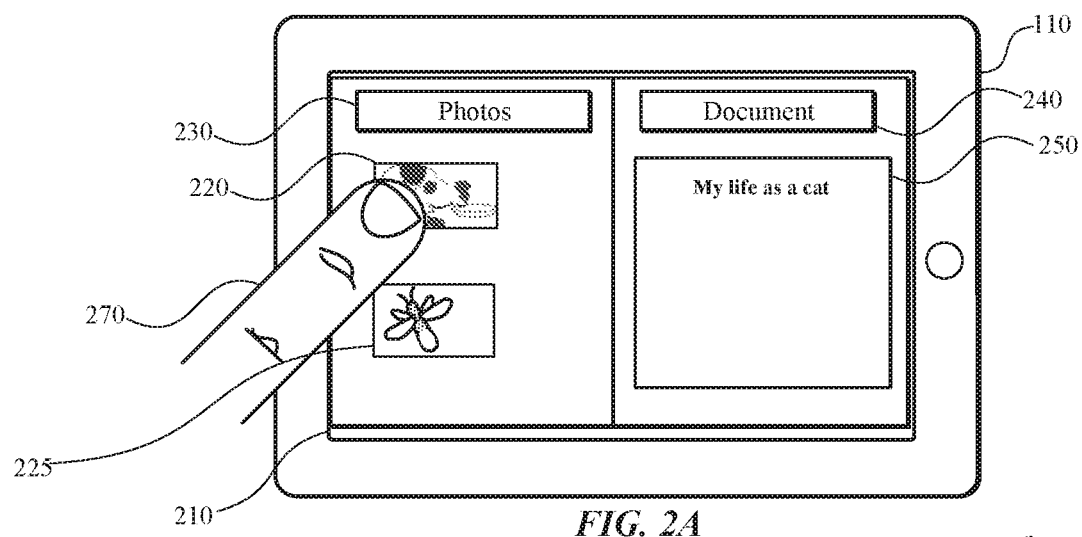
FIGS. 2A-2C illustrate an example drag and drop operation performed on an electronic device that includes a touchscreen in accordance with one or more implementations.
Figure 2B:
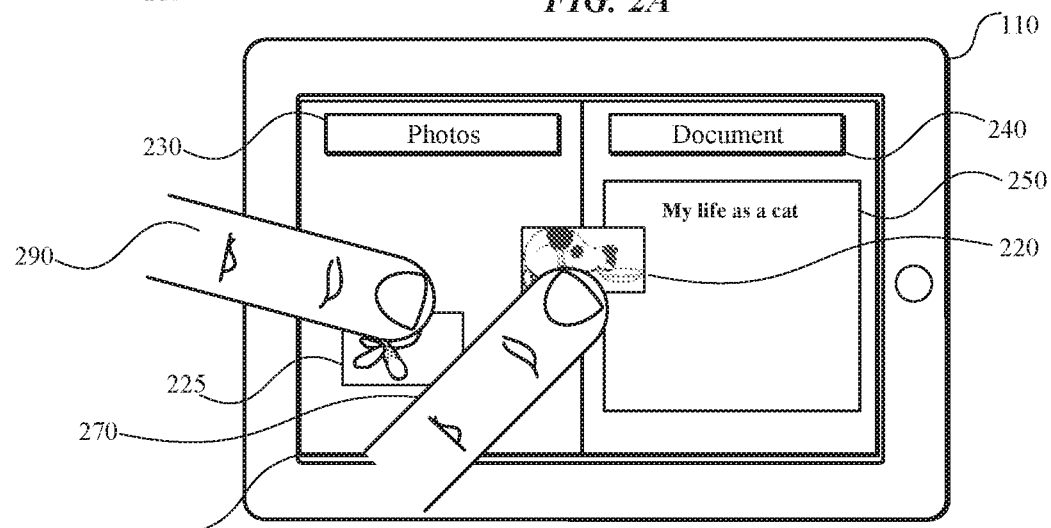
Figure 2C:
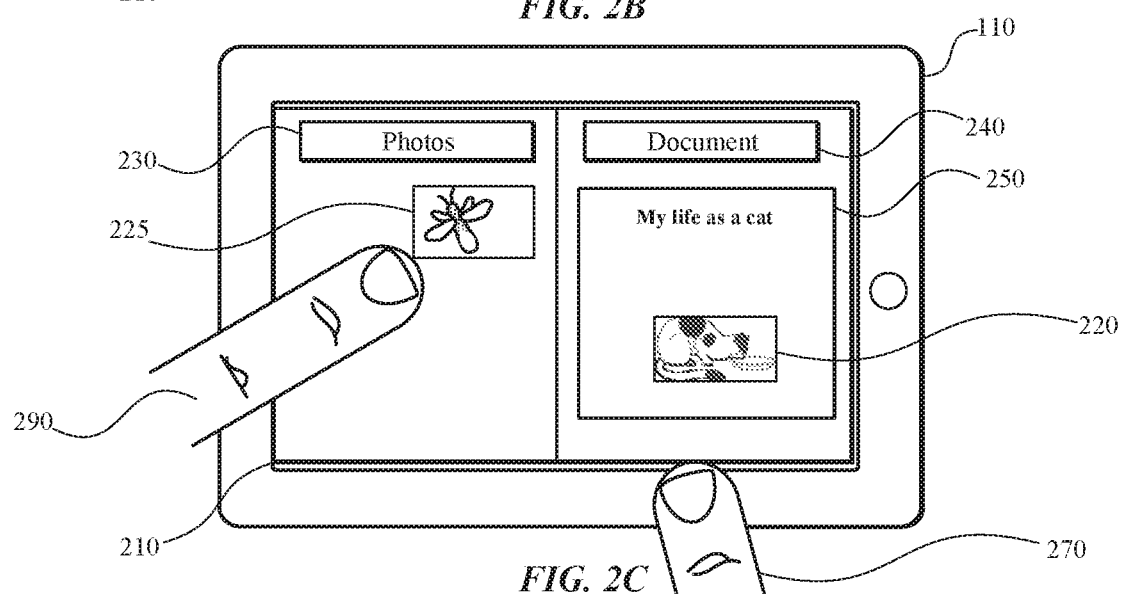

FIGS. 2A-2C illustrate an example drag and drop operation performed on an electronic device 110 that includes a touchscreen in accordance with one or more implementations. For explanatory purposes, the example drag and drop operation illustrated in FIGS. 2A-2C is described as being performed on the electronic device 110 of FIG. 1. However, the example drag and drop operation illustrated in FIGS. 2A-2C may be performed on any electronic device that includes a touchscreen or any electronic device with a touchpad.

As illustrated in FIG. 2A, a touchscreen 210 of the electronic device 110 may concurrently display two different applications that may be referred to as a source application 230 (e.g., a photo library application or any application), and a destination application 240 (e.g., a document editor application or any application). For explanatory purposes, the applications 230, 240 are illustrated in FIG. 2A as being displayed side-by-side; however, the applications may be currently displayed in any manner and/or in any orientation. The electronic device 110 may detect an initial touch input based on a user's finger 270 touching the touchscreen 210 of the electronic device 110. For example, a touch input may be detected based on a user's finger 270 touching an image 220 displayed in an image library of the source application 230. The image 220 may be a representation of a data item stored on the electronic device 110 and/or on the server 120 or the server 122, such as an image file, a sound file, a video tile, etc. in at least one implementation, the touch input does not have to touch the image 220, and could be instead near another user interface element or near the image 220. In addition, the touch input may not be a static touch input and could be a gesture or moving touch input in an example. For explanatory purposes, the drag and drop operation is described with respect to the image 220; however, any type, form, or representation, of data may be dragged from the source application 230 to the destination application 240, or vice-versa.

The touch input in the source application 230 may be identified by the electronic device 110 as the initiation of a drag session for a drag and drop operation based on one or more factors, such as, for example, the duration of the touch input. In an example, the touch input may correspond with a long touch gesture in which the touch input is held for at least a period of time on the touchscreen 210 of the electronic device 110. Upon detection of the long touch gesture associated with the initiation of the drag session, the electronic device 110 may cancel (or forgo processing) other current touch inputs in the source application 230 that are received by the electronic device 110. In an example, a hierarchy for touch inputs may prioritize the long touch gesture for initiating the drag session over other types of touch gestures that may be received during the drag session and the electronic device 110 may delay the processing of these other touches until detection of a touch release that corresponds with dropping the item into the destination application 240. In another example, the hierarchy for touch inputs may prioritize a long touch or press gesture such that this gesture overrides another gesture. Further, although FIG. 2A illustrates an example touch input involving a single finger, in other instances, the electronic device 110 is configured to detect touch inputs from multiple fingers that indicate the initiation of a drag session. The electronic device 110 may support any other type of touch input for initiating a drag session. As further described in detail below by reference to FIGS. 2G-2H, FIGS. 2I-2J, and FIGS. 2K-2L, below, multiple drag sessions are supported by the electronic device 110.

In one or more implementations, only the source application 230 may be displayed when the drag session is initiated and/or for the duration of the drag session. For example, the image 220 can be dragged from the source application 230 to a shortcut or other representation of the destination application 240. In one or more implementations, the destination application 240 may not be executing when the drag session is initiated and is executed or launched in response to the image 220 being dropped onto the representation of the destination application 240. In another example, the destination application 240 may be launch by hovering the image 220 over the representation of the destination application. In yet another example, the destination application 240 may be launched by another selection or touch input to launch the destination application 240.

As illustrated in FIG. 2B, the electronic device 110 detects a drag gesture caused by the user's finger 270 dragging across the touchscreen 210 of the electronic device 110. The drag gesture drags the selected image 220 from the source application 230 to the destination application 240. The example illustrated in FIG. 2B shows the drag session in-progress where the image 220 being dragged is positioned between the source application 230 and the destination application 240.

While the drag session is occurring and active, the source application 230 and/or the destination application 240 are responsive and may be interacted with, by the user, in other ways. In particular, the electronic device 110 supports multi-touch inputs by allowing other touch inputs to occur during the drag session. These other touch inputs may be received by a background process, as part of a drag and drop architecture, which is described in more detail by reference to FIG. 3 below. In this example, an image 225 in the source application 230 may be moved by the user during the drag session. The image 225 may be a representation of a data item stored on the electronic device 110 and/or on the server 120 or the server 122, such as an image file, a video that is currently playing in an application (locally or streamed over the network 106), a sound file, etc. The representation may also be for an application, a data item, a file, group of files, etc. As shown in FIG. 2B, the electronic device 110 detects a separate touch input indicating that a user's finger 290 has selected the image 225 and is moving the image 225 within the source application 230. In another example, the image 220 may also be interacted with during the drag session.

As illustrated in FIG. 2C, the electronic device 110 detects the completion of the drag gesture when the user's finger 270 is lifted from the touchscreen 210 of the electronic device 110. When the electronic device 110 detects the completion of the drag gesture, the electronic device 110 determines whether the destination application 240 satisfies any security and/or data access policies associated with the data item corresponding to the image 220. An example process of implementing a security policy for a drag and drop operation is discussed further below with respect to FIG. 5. Although the image 220 has been discussed with respect to the user's finger 270, the electronic device 110 is configured to support other types of touch inputs for dragging an item as part of the drag gesture. For example, touch inputs from a pen/pencil or electronic stylus device may be detected by the electronic device 110 for dragging an item from the source application 230 to the destination application 240 as part of a drag session.

As mentioned above, during the drag session, the source application 230 and/or the destination application 240 are responsive and may be interacted with by the user in other ways based on provided multi-touch support from the electronic device 110. As shown in FIG. 2C, during the drag session, the image 225 has been moved from its original position in FIG. 2B as a result of the electronic device 110 detecting touch input corresponding to user's finger 290 moving the image 225 to a different location within the source application 230.

If the destination application 240 satisfies any security and/or data access policies associated with the data item corresponding to the image 220, the image 220 is allowed to be dropped into the destination application 240, such as into the document 250, and the data item corresponding to the image 220 is transferred from the source application 230 to the destination application 240. An example process of performing a data transfer as part of a drag and drop operation is discussed further below with respect to FIG. 4A.

In one or more implementations, a user can drag and drop (or perform another gesture such as a flick gesture) a representation of an application (e.g., an application shortcut) over or near a given portion of the display (e.g. a picture-in-picture area) provided in the touchscreen 210 of the electronic device 110, and the application will launch with the application window being displayed in the given portion of the display, such as, for example, in conjunction with the concurrent display of one or more other applications in one or more other portions of the display.

In one or more implementations, while the aforementioned data transfer is being performed, the source application 230 and/or destination application 240 may be interacted with, by the user, and/or placed into the background without disrupting the data transfer. Further, another different application may be launched or opened while the data transfer is being performed. The normal operations of the electronic device 110 therefore are supported while the data transfer is being performed without negatively impacting the data transfer and/or system performance.

In one or more implementations, the source application 230 and/or destination application 240 may implement a table or collection view, and therefore the image 220 may be inserted into a table or collection view of the destination application 240. An example drag and drop operation involving a table view is discussed further below with respect to FIGS. 7A-7B, and an example drag and drop operation involving a collection view is discussed further below with respect to FIGS. 8A-8B. Furthermore, an example process for performing a drag and drop operation involving a table or collection view is discussed further below with respect to FIG. 9.

In one or more implementations, instead of dragging an image 220 corresponding to a data item from the source application 230 to the destination application 240, the user may drag a text selection from the source application 230 to the destination application 240. An example of performing a drag and drop operation for text selection is discussed further below with respect to FIGS. 6A-6C. An example process of performing a drag and drop operation for a text selection is discussed further below with respect to FIG. 6D.

In one or more implementations, the electronic device 110 provides an animation for indicating that the image 220 is now part of the drag session, which may be provided after the detection of a specific gesture by the electronic device 110. In an example, the gesture may be a long touch gesture where the user presses down a finger on a representation of a data item (e.g., the image 220) and holds the finger there for a predetermined period of time. After the detection of this gesture, the electronic device 110 may, for example, perform an animation showing the image 220 lifting up from the user interface of the source application 230. The electronic device 110 may customize this animation to include any other type of animation for indicating that the image 220 is part of the drag session. In an implementation, the source application 230 may implement, specify, or provide the animation.

In one or more implementations, the electronic device 110 provides an animation for indicating that the image 220 is being dropped into the destination application 240, which may be provided after the detection of the completion of the drag gesture (e.g., when the user's finger 270 is lifted from the touchscreen 210 of the electronic device 110). For example, the electronic device 110 may perform an animation showing the image 220 scaling down and/or fading out from the user interface of the destination application 240. The electronic device 110 may customize this animation to include any other type of animation.

In one or more implementations, the drag and drop operation may be canceled based on a detected input (or set of inputs) from the user indicating a cancelation of the drag session and/or based on the electronic device 110 determining that the drop operation cannot be completed when the user lifts their finger to perform the drop operation (e.g. due to one or more security constraints that are discussed further below). For example, the electronic device 110 may detect that the user released the drag gesture within the source application 230 without moving the image 220 over to the destination application 240. In another example, the electronic device 110 may detect that the user moved the image 220 over to the destination application 240 but then moved the image 220 back to the source application 230 and released the drag gesture over the source application 230. After detecting the cancelation of the drag session, the electronic device 110 may provide an animation for indicating that the drag session is canceled. For example, the electronic device HO may, perform an animation showing the image 220 scaling up and/or flying out from the user interface of the source application 230. The electronic device 110 may customize this animation to include any other type of animation.

In one or more implementations, the subject system allows for multiple data items to be dragged concurrently as part of the same drag session. The data items may be selected together when the drag session is initiated and/or additional items may be added to a drag session in progress. For example, while the user's finger 270 is dragging the image 220, the user may select, using another gesture such as a tap from another finger, the image 225 from the source application 230 to be included in the drag session. Thus, the subject system supports multi-touch input where multiple touch inputs, such as multiple fingers, may be concurrently detected. Further, the subject system allows for removing an item (s) from the same drag session. For example, the image 225 that was added to the same drag session may also be removed. The subject system also supports gestures for interacting with data items included in the same drag session. For example, the electronic device 110 may detect that the user performed a pinch to zoom in gesture, and may zoom in multiple items that have been included as part of the drag session. In addition, the electronic device 110 may detect that the user performed a pinch to zoom out gesture, and may zoom out multiple items that have been included as part of the drag session. The electronic device 110 can support other types of touch inputs for interacting with an item in a drag session. For example, the electronic device 110 may detect touch inputs from two fingers of the user which will enable the item to be rotated and/or scaled based on the two finger touch inputs.

Figure 2D:
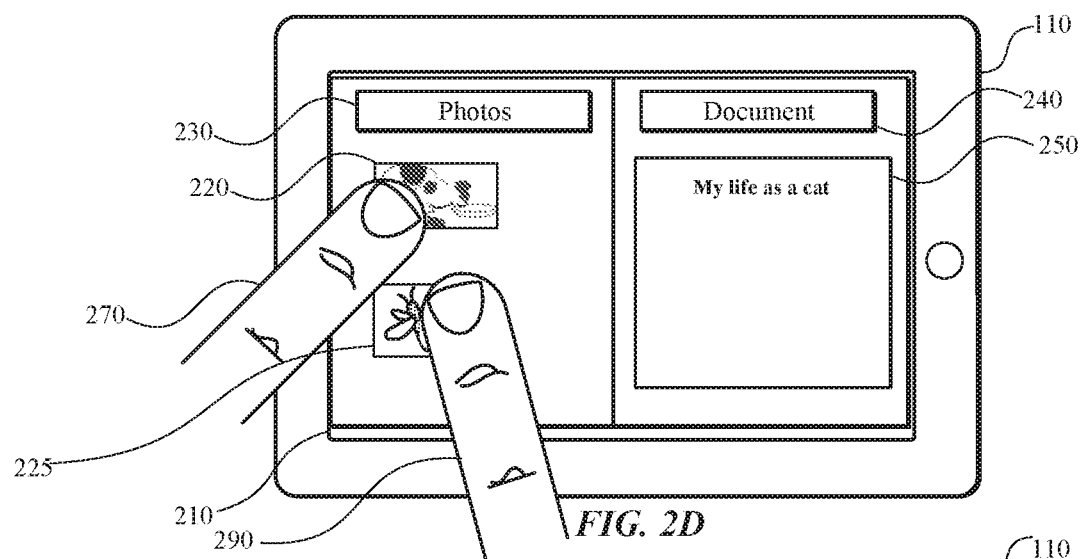
FIGS. 2D-2F illustrate an example drag and drop operation involving multiple data items performed on the electronic device that includes a touchscreen in accordance with one or more implementations.
Figure 2E:
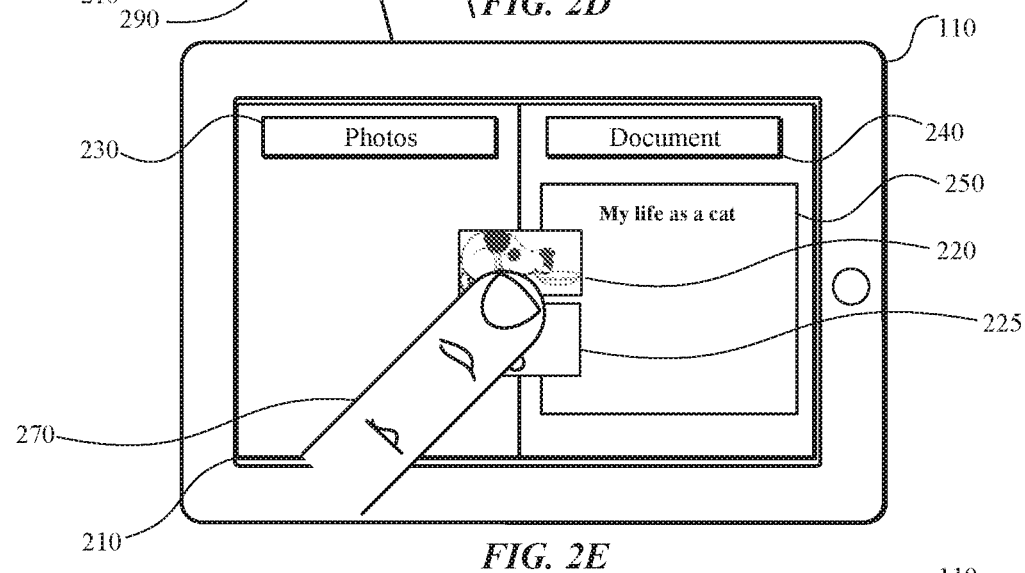
Figure 2F:
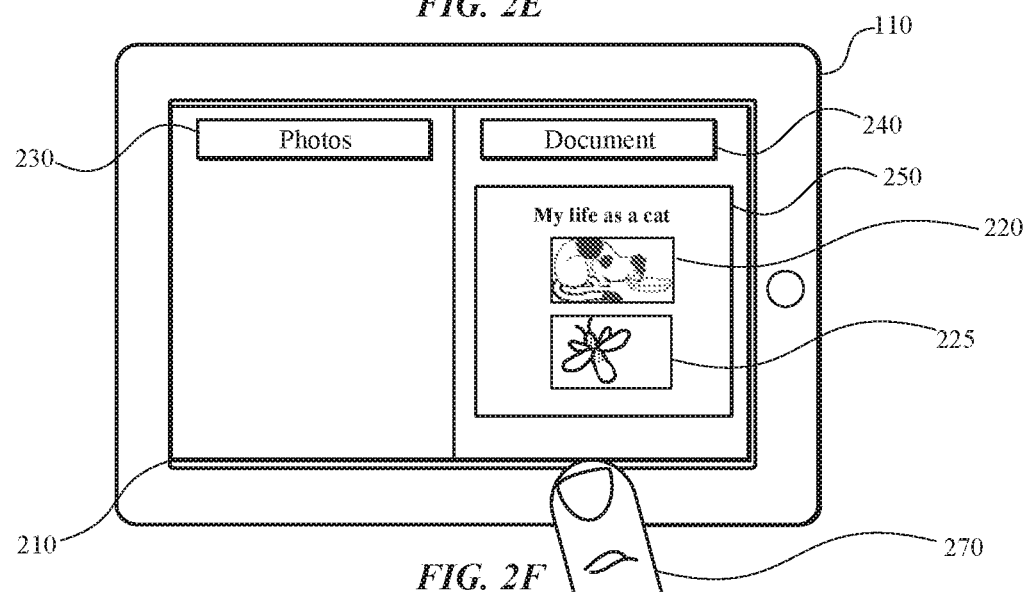

The subject system provides support for including multiple data items as part of a drag session. FIGS. 2D-2F illustrate an example drag and drop operation involving multiple data items performed on the electronic device 110 that includes a touchscreen in accordance with one or more implementations. For explanatory purposes, the example drag and drop operation illustrated in FIGS. 2D-2F is described as being performed on the electronic device 110 of FIG. 1. However, the example drag and drop operation illustrated in FIGS. 2D-2E may be performed on any electronic device that includes a touchscreen.

As illustrated in FIG. 2D, the electronic device 110 may detect an initial touch input based on the user's finger 270 touching the touchscreen 210 of the electronic device 110. For example, a touch input may be a long touch gesture detected based on the user's finger 270 touching the image 220 for a predetermined period of time. Responsive to the touch input, the electronic device 110 may include the image 220 as part of a new drag session.

For including another data item in a drag session, the electronic device 110 may detect a second initial touch input based on the user's finger 290 touching the touchscreen 210 of the electronic device 110. For example, a touch input may be a tap gesture detected based on the user's finger 290 touching the image 225 in the image library of the source application 230. Responsive to the second touch input, the electronic device 110 may add the image 225 as part of the drag session. Although a tap gesture is described as an example, the source application may utilize any gesture or type of touch input for adding a data item to an existing drag session. In this manner, multiple data items may be added to the same drag session prior to the user dragging the items to the destination application 240. The multiple items include in the drag session may be arranged in different ways. In an example, the items may be arranged in a stack in which the items are organized in a fan pattern or in a grid, or the items may be arranged substantially adjacent to each other.

In one or more implementations, the electronic device 110 may provide an animation to indicate that another data item has been added to the drag session. For example, the added item can be animated to move toward an existing drag session item or item stack.

As illustrated in FIG. 2E, the electronic device 110 detects a drag gesture caused by the user's finger 270 dragging across the touchscreen 210 of the electronic device 110. In this example, the drag gesture drags the selected images 220 and 225, as part of the same drag session, from the source application 230 to the destination application 240. The example illustrated in FIG. 2E shows the drag session in-progress where the images 220 and 225 being dragged are positioned between the source application 230 and the destination application 240. Although FIG. 2E illustrates the image 220 being positioned above the image 225, other arrangements of the images are possible. In another example, the image 225 may be placed to the right of the image 220 while being dragged or vice-versa.

As illustrated in FIG. 2F, the electronic device 110 detects the completion of the drag gesture when the user's finger 270 is lifted from the touchscreen 210 of the electronic device 110. When the electronic device 110 detects the completion of the drag gesture, the electronic device 110 determines whether the destination application 240 satisfies any security and/or data access policies associated with the data items corresponding to the image 220 and the image 225.

If the destination application 240 satisfies any security and/or data access policies associated with the data items corresponding to the image 220 and the image 225, the images 220 and/or 225 are allowed to be dropped into the destination application 240, such as into the document 250, and the data items corresponding to the images 220 and/or 225 are transferred from the source application 230 to the destination application 240. If the destination application 240 does not satisfy a security or data access policy associated with the data item corresponding to the image 220 and/or the data item corresponding to the image 225, the drop operation may be cancelled in part, or in full.

In one or more implementations, the electronic device 110 may support multiple drags sessions that occur simultaneously while processing other touch inputs. For example, the user may launch another application during the multiple drag sessions and/or interact with another application without negatively impacting system performance. Further examples of multiple drag sessions in connection with multiple drag and drop operations are described below.

Figure 2G:
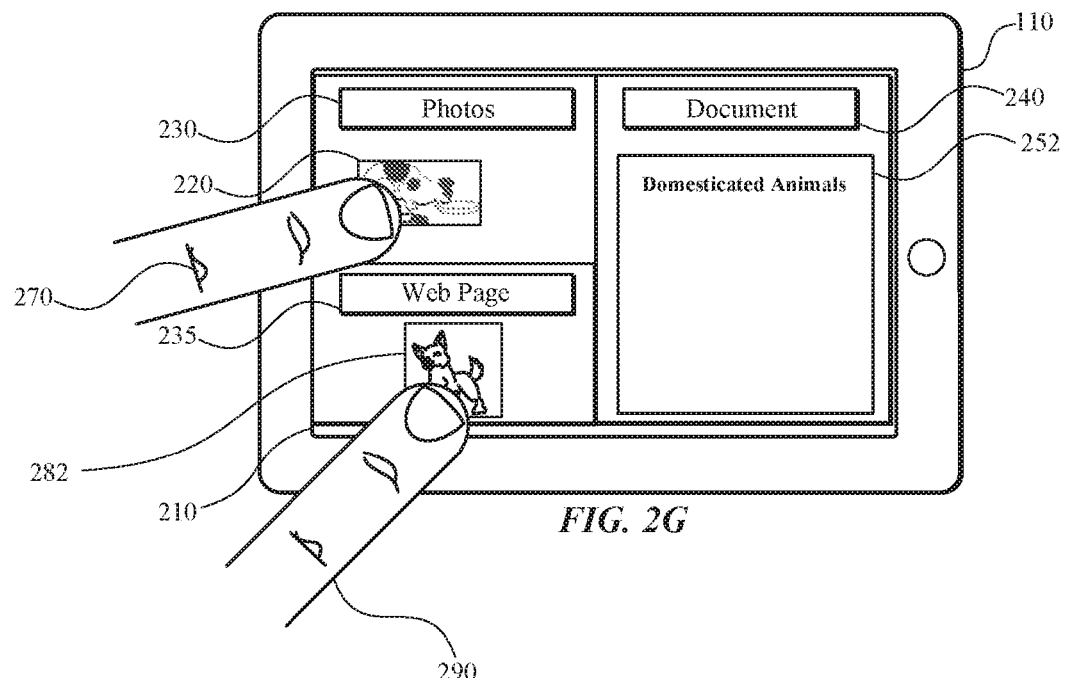
FIGS. 2G-2H illustrate example multiple drag and drop operations involving different data items from different source applications performed on the electronic device that includes a touchscreen in accordance with one or more implementations.
Figure 2H:
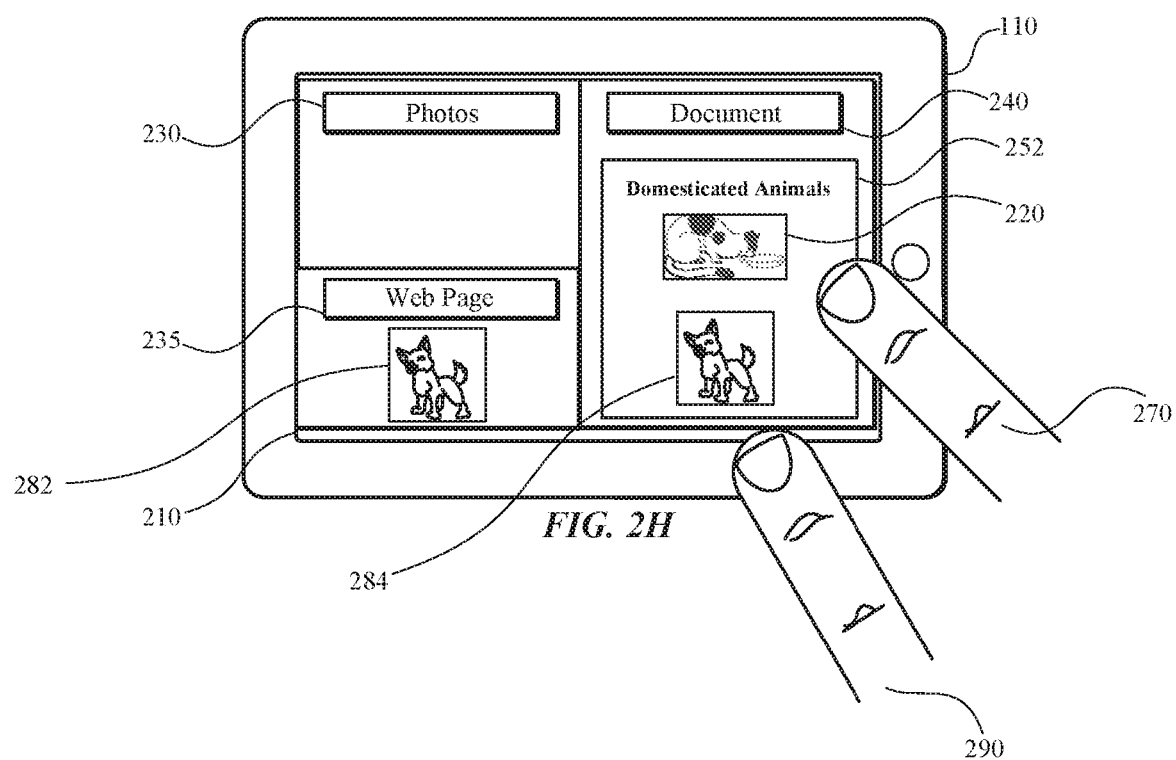

FIGS. 2G-2H illustrate example multiple drag and drop operations involving different data items from different source applications performed on the electronic device 110 that includes a touchscreen in accordance with one or more implementations. For explanatory purposes, the example drag and drop operations illustrated in FIGS. 2G-2H are described as being performed on the electronic device 110 of FIG. 1. However, the example drag and drop operations illustrated in FIGS. 2G-2H may be performed on any electronic device that includes a touchscreen.

As illustrated in FIG. 2G, for including a data item in a first drag session, the electronic device 110 may detect an initial touch input based on the user's finger 270 touching the touchscreen 210 of the electronic device 110. For example, a touch input may be a long touch gesture detected based on the user's finger 270 touching the image 220 for a predetermined period of time. Responsive to the touch input, the electronic device 110 may include the image 220 as part of a new drag session associated with the source application 230.

In FIG. 2G, a second source application 235 is provided below the source application 230 (e.g., a web browser application or any application). For including a data item corresponding to an image 282 in a second drag session associated with the different source application 235, the electronic device 110 may detect a second initial touch input based on the user's finger 290 touching the touchscreen 210 of the electronic device 110. For example, a touch input may be a long touch gesture detected based on the user's finger 290 touching the image 282 for a predetermined period of time. Responsive to the touch input, the electronic device 110 may include the image 282 as part of a second new drag session. The image 282 may be a representation of a data item stored on the electronic device 110 and/or on the server 120 or the server 122, such as an image file, a sound file, etc.

The electronic device 110 may detect a first drag gesture caused by the user's finger 270 dragging across the touchscreen 210 of the electronic device 110. In this example, the drag gesture drags the image 220, as part of the first drag session, from the source application 230 to the destination application 240.

The electronic device 110 may detect a second drag gesture caused by the user's finger 290 dragging across the touchscreen 210 of the electronic device 110. In this example, the drag gesture drags a representation of the image 282, as part of the second drag session, from the source application 235 to the destination application 240.

As illustrated in FIG. 2H, the electronic device 110 detects the completion of the first drag gesture when the user's finger 270 is lifted from the touchscreen 210 of the electronic device 110. When the electronic device 110 detects the completion of the first drag gesture, the electronic device 110 determines whether the destination application 240 satisfies any security and/or data access policies associated with the data item corresponding to the image 220.

Similarly, the electronic device 110 detects the completion of the second drag gesture when the user's finger 290 is lifted from the touchscreen 210 of the electronic device 110. When the electronic device 110 detects the completion of the second drag gesture, the electronic device 110 determines whether the destination application 240 satisfies any security and/or data access policies associated with the data item corresponding to the image 282.

If the destination application 240 satisfies any security and/or data access policies associated with the data items corresponding to the image 220 and the image 225, the images 220 and/or 225 are allowed to be dropped into the destination application 240, such as into the document 252, and the data items corresponding to the images 220 and/or 282 are transferred from the source application 230 and/or the source application 235 to the destination application 240. In the example of FIG. 2H, the data transfer of the image 220 may be a move operation where the image 220 is moved from the source application 230 over to the destination application 240. In comparison, the data transfer of the image 282 may be a copy operation where the image 282 is copied from the source application 235 over to the destination application 240 and inserted into the destination application 240 as copied image 284.

Figure 2I:
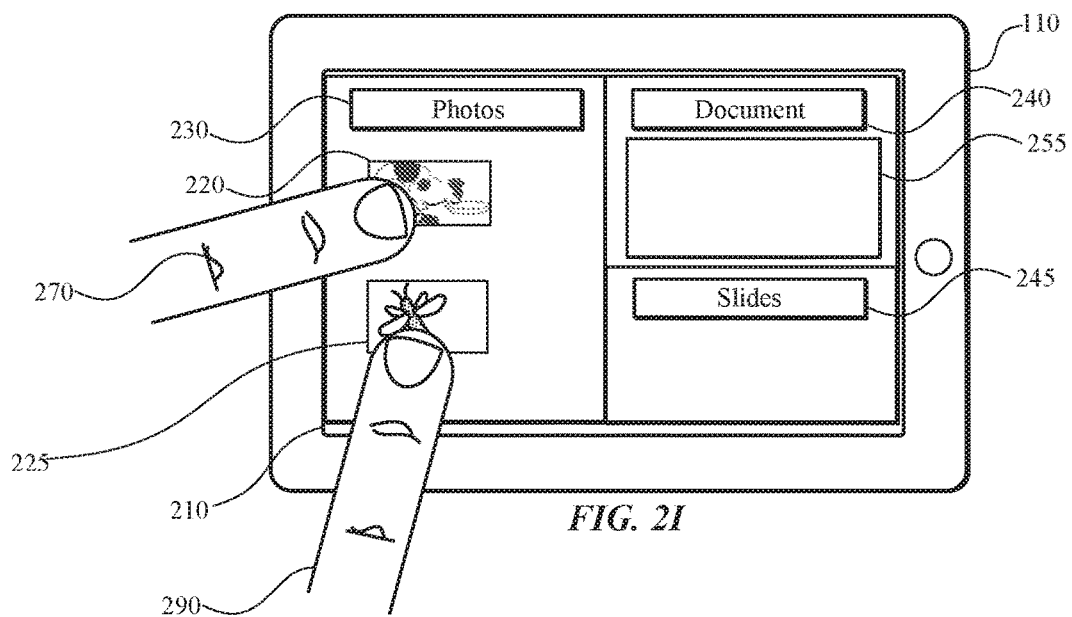
FIGS. 2I-2J illustrate example multiple drag and drop operations involving multiple data items from one source application to different destination applications performed on the electronic device that includes a touchscreen in accordance with one or more implementations.
Figure 2J:
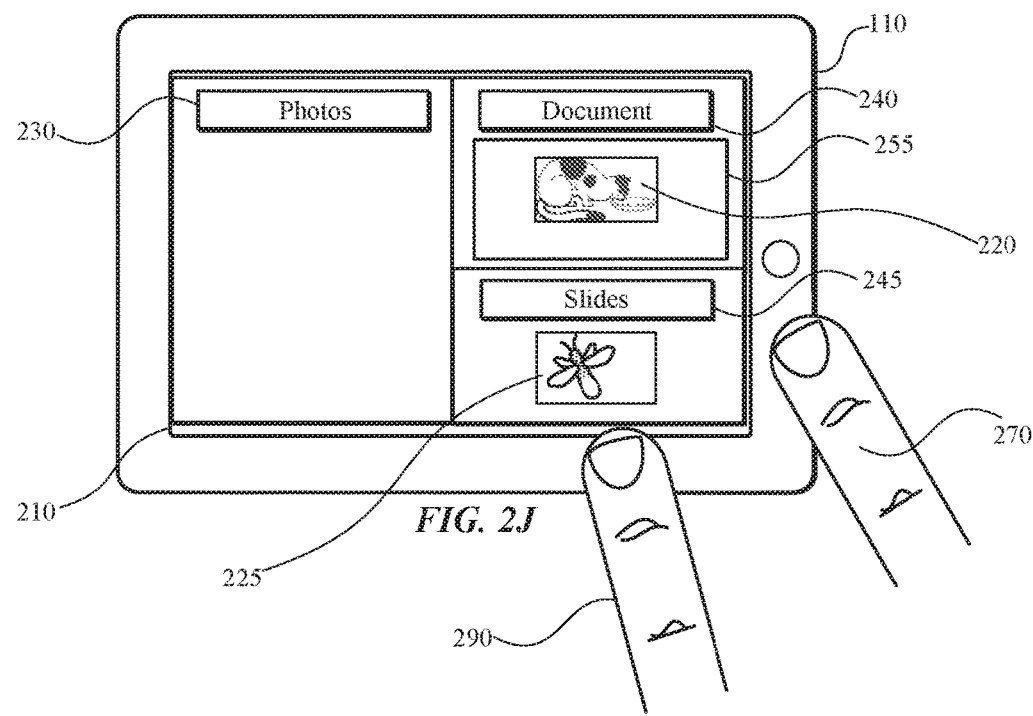

FIGS. 2I-2J illustrate example multiple drag and drop operations involving multiple data items from one source application to different destination applications performed on the electronic device 110 that includes a touchscreen in accordance with one or more implementations. For explanatory purposes, the example drag and drop operations illustrated in FIGS. 2I-2J are described as being performed on the electronic device 110 of FIG. 1. However, the example drag and drop operations illustrated in FIGS. 2I-2J may be performed on any electronic device that includes a touchscreen.

As illustrated in FIG. 2I, for including a data item in a first drag session, the electronic device 110 may detect an initial touch input based on the user's finger 270 touching the touchscreen 210 of the electronic device 110. For example, a touch input may be a long touch gesture detected based on the user's finger 270 touching the image 220 for a predetermined period of time. Responsive to the touch input, the electronic device 110 may include the image 220 as part of a new drag session associated with the source application 230.

For including a data item corresponding to the image 225 in a second drag session associated with the same source application 230, the electronic device 110 may detect a second initial touch input based on the user's finger 290 touching the touchscreen 210 of the electronic device 110. For example, a touch input may be a long touch gesture detected based on the user's finger 290 touching the image 225 for a predetermined period of time. Responsive to the touch input, the electronic device 110 may include the image 225 as part of a second new drag session associated with the source application 230.

The electronic device 110 may detect a first drag gesture caused by the user's finger 270 dragging across the touchscreen 210 of the electronic device 110. In this example, the drag gesture drags the image 220, as part of the first drag session, from the source application 230 to the destination application 240.

The electronic device 110 may detect a second drag gesture caused by the user's finger 290 dragging across the touchscreen 210 of the electronic device 110. In this example, the drag gesture drags the image 225, as part of the second drag session, from the source application 230 to a different destination application 245 (e.g., a presentation application or any application).

As illustrated in FIG. 2J, the electronic device 110 detects the completion of the first drag gesture when the user's finger 270 is lifted from the touchscreen 210 of the electronic device 110. When the electronic device 110 detects the completion of the first drag gesture, the electronic device 110 determines whether the destination application 240 satisfies any security and/or data access policies associated with the data item corresponding to the image 220.

Similarly, the electronic device 110 detects the completion of the second drag gesture when the user's finger 290 is lifted from the touchscreen 210 of the electronic device 110. When the electronic device 110 detects the completion of the second drag gesture, the electronic device 110 determines whether the destination application 245 satisfies any security and/or data access policies associated with the data item corresponding to the image 225.

If the destination application 240 satisfies any security and/or data access policies associated with the data item corresponding to the image 220, the image 220 is allowed to be dropped into the destination application 240, such as into the document 255, and the data item corresponding to the image 220 is transferred from the source application 230 to the destination application 240.

If the destination application 245 satisfies any security and/or data access policies associated with the data item corresponding to the image 225, the image 225 is allowed to be dropped into the destination application 245, and the data item corresponding to the image 225 is transferred from the source application 230 to the destination application 245.

Figure 2K:
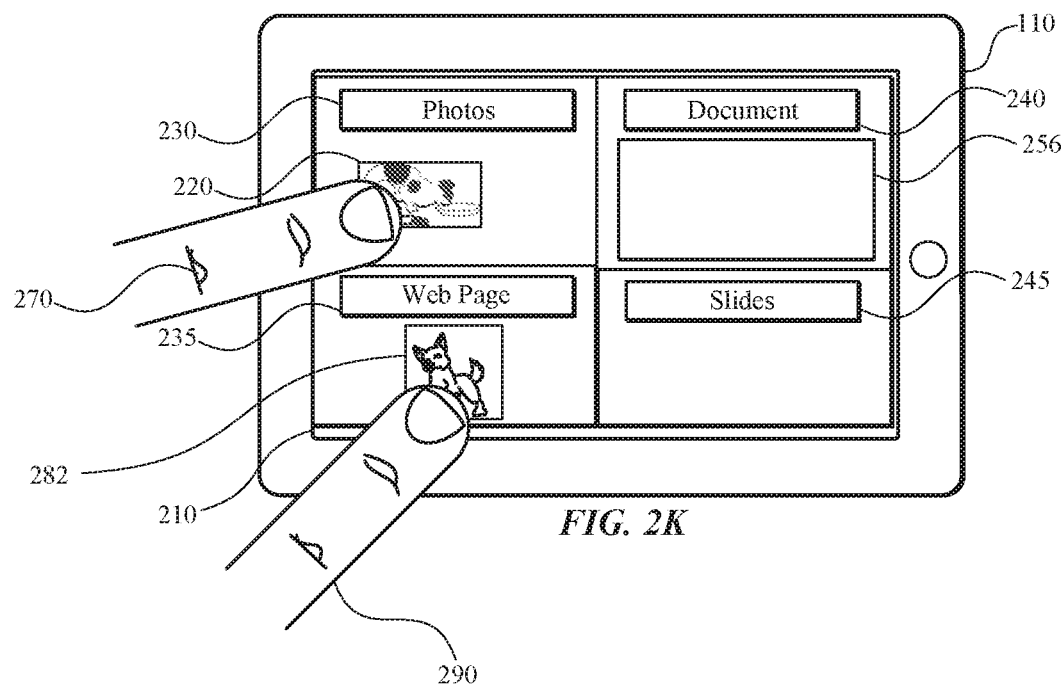
FIGS. 2K-2L illustrate example multiple drag and drop operations involving data items from different source applications to different destination applications performed on the electronic device that includes a touchscreen in accordance with one or more implementations.
Figure 2L:
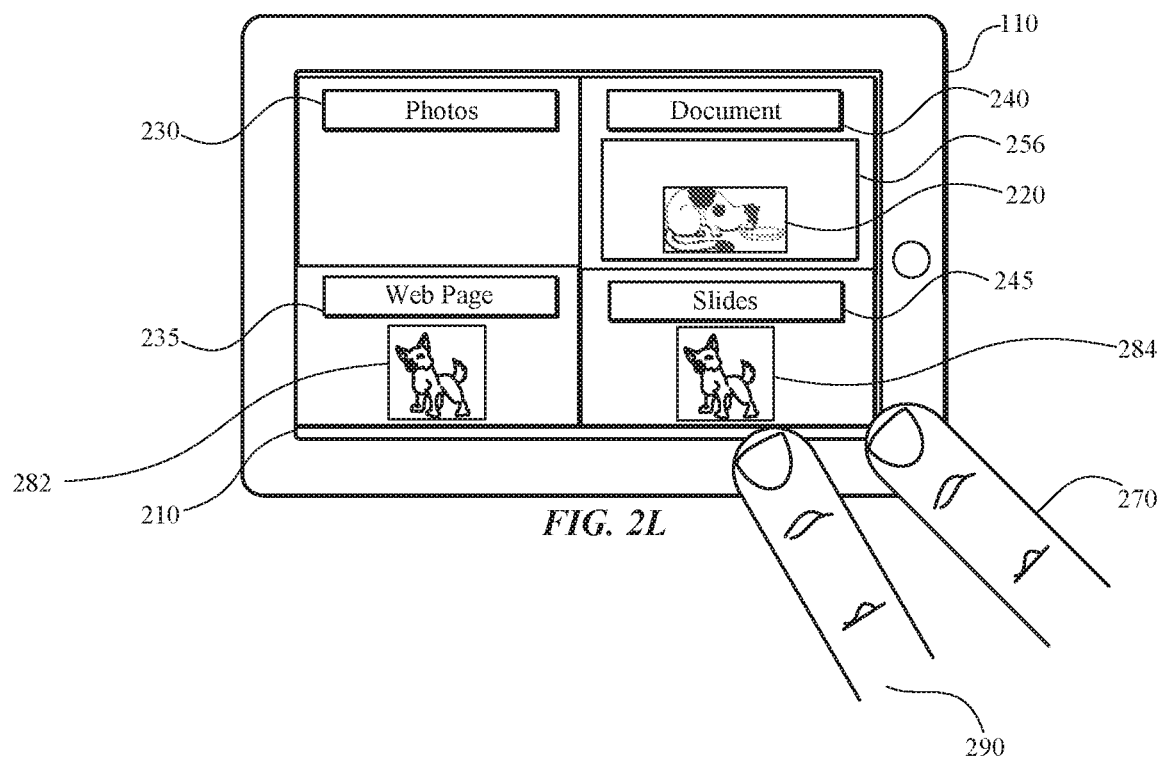

FIGS. 2K-2L illustrate example multiple drag and drop operations involving data items from different source applications to different destination applications performed on the electronic device 110 that includes a touchscreen in accordance with one or more implementations. For explanatory purposes, the example drag and drop operations illustrated in FIGS. 2K-2L are described as being performed on the electronic device 110 of FIG. 1. However, the example drag and drop operations illustrated in FIGS. 2K-2L may be performed on any electronic device that includes a touchscreen.

As illustrated in FIG. 2K, for including a data item in a first drag session, the electronic device 110 may detect an initial touch input based on the user's finger 270 touching the touchscreen 210 of the electronic device 110. For example, a touch input may be a long touch gesture detected based on the user's finger 270 touching the image 220 for a predetermined period of time. Responsive to the touch input, the electronic device 110 may include the image 220 as part of a new drag session associated with the source application 230.

In FIG. 2K, the second source application 235 is provided below the source application 230 (e.g., a web browser application or any application). For including a data item corresponding to the image 282 in a second drag session associated with the different source application 235, the electronic device 110 may detect a second initial touch input based on the user's finger 290 touching the touchscreen 210 of the electronic device 110. For example, a touch input may be a long touch gesture detected based on the user's finger 290 touching the image 282 for a predetermined period of time. Responsive to the touch input, the electronic device 110 may include the image 282 as part of a second new drag session.

The electronic device 110 may detect a first drag gesture caused by the user's finger 270 dragging across the touchscreen 210 of the electronic device 110. In this example, the drag gesture drags the image 220, as part of the first drag session, from the source application 230 to the destination application 240.

The electronic device 110 may detect a second drag gesture caused by the user's finger 290 dragging across the touchscreen 210 of the electronic device 110. In this example, the drag gesture drags a representation of the image 282, as part of the second drag session, from the source application 235 to the second destination application 245.

As illustrated in FIG. 2L, the electronic device 110 detects the completion of the first drag gesture when the user's finger 270 is lifted from the touchscreen 210 of the electronic device 110. When the electronic device 110 detects the completion of the first drag gesture, the electronic device 110 determines whether the destination application 240 satisfies any security and/or data access policies associated with the data item corresponding to the image 220.

Similarly, the electronic device 110 detects the completion of the second drag gesture when the user's finger 290 is lifted from the touchscreen 210 of the electronic device 110. When the electronic device 110 detects the completion of the second drag gesture, the electronic device 110 determines whether the second destination application 245 satisfies any security and/or data access policies associated with the data item corresponding to the image 282.

If the destination application 240 satisfies any security and/or data access policies associated with the data item corresponding to the image 220, the image 220 is allowed to be dropped into the destination application 240, such as into the document 256, and the data item corresponding to the image 220 is transferred from the source application 230 to the destination application 240.

If the destination application 245 satisfies any security and/or data access policies associated with the data item corresponding to the image 282, the image 282 is allowed to be dropped into the destination application 245, and the data item corresponding to the image 282 is transferred from the source application 235 to the destination application 245.

In the example of FIG. 2L, the data transfer of the image 220 may be a move operation where the image 220 is moved from the source application 230 over to the destination application 240. In comparison, the data transfer of the image 282 may be a copy operation where the image 282 is copied from the source application 235 over to the second destination application 245.

Figure 3:
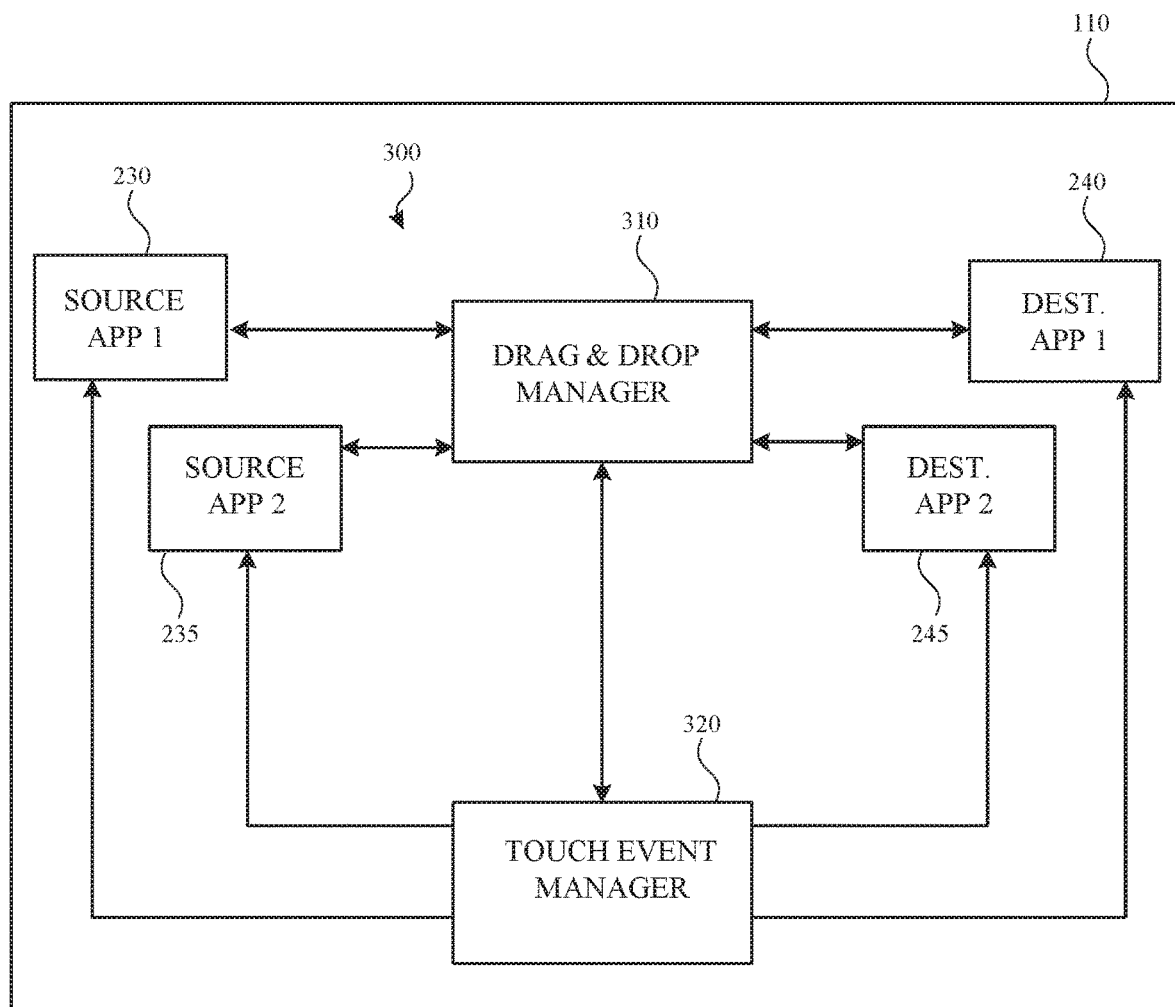
FIG. 3 illustrates an example drop and drop architecture that may be implemented on an electronic device that includes a touchscreen in accordance with one or more implementations.

FIG. 3 illustrates an example drop and drop architecture 300 that may be implemented on an electronic device 110 that includes a touchscreen in accordance with one or more implementations. For explanatory purposes, the drag and drop architecture 300 is described as being implemented by the electronic device 110 of FIGS. 1 and 2, such as by a processor and/or memory of the electronic device 110; however the drag and drop architecture 300 may be implemented by any other electronic device that includes a touchscreen. Not all of the depicted components may be used in all implementations, however and one or more implementations may include additional or different components than those shown in the figure. Variations in the arrangement and type of the components may be made without departing from the spirit or scope of the claims as set forth herein. Additional components, different components, or fewer components may be provided.

The drag and drop architecture 300 includes a drag and drop manager 310 which is configured to manage a drag session corresponding to a drag event between the source application 230 and the destination application 240. Multiple drag sessions are supported by the drag and drop architecture 300. In particular the drag and drop manager 310 is configured to manage a separate drag session corresponding to a drag event between the source application 235 and the destination application 245. For explanatory purposes, the discussion below references the drag session associated with the source application 230 and the destination application 240; however, the discussion below can also apply with respect to the drag session associated with the source application 235 and the destination application 245.

In one or more implementations, the drag and drop manager 310 may be implemented as a user interface (UI) process, such as an application or daemon running on the electronic device 110 that has system-level privileges, includes a render context associated with the application that enables the application to draw or render over any user interface displayed on the touchscreen, and also allows the application to create drag sessions associated with drag events. In an example, the render context associated with the application (e.g., the drag and drop manager 310) is a transparent full-screen layer that sits on top of any user interface displayed on the touchscreen.

In one or more implementations, the drag and drop manager 310 manages drag item previews during the drag session. For example, while being dragged, an item from a source application may be provided as a preview corresponding to a graphical representation of the item. For example, depending on the type of item, the preview of the item may be a thumbnail image, a video clip, or any other appropriate graphical representation. As the item is being dragged from the source application into the destination application, the preview of the item presented in the destination application may be a different graphical representation than the preview in the source application. The drag and drop manager may provide an animation that transitions or morphs the different representations as the item is being dragged from the source application over to the destination application and vice-verse. Further, each preview in the source application 230 and/or the destination application 240 may be dynamically generated such that a preview transitions from a first type of graphical representation into a second type of graphical representation and so on while being presented within that application. In another example, the drag and drop manager 310 may not provide a preview for an item during a drag session, or only provide a preview when the item is dragged in the source application only or the destination only.

In an implementation, the drag and drop manager 310 may utilize a portal for providing the preview of the item in the destination application 240. A portal refers to a pixel-by-pixel reference to a GUI object specified by the source application 230 that enables the drag and drop manager 310 to access and process the specified GUI object for providing the preview of the item in the destination application 240. A portal therefore is not a replication of the application's specified GUI object. Instead, a portal "points to" or "references" the application's GUI object, such as in a render tree. Examples of a portal of this type are disclosed in more detail in U.S. Provisional Patent Application entitled "Core Animation Portals," having U.S. patent application Ser. No. 62/506,988, and filed on May 16, 2017, which is hereby incorporated by reference in its entirety for all purposes.

With reference to FIG. 2A, a drag event includes an initial touch input selecting an item (e.g., the image 220) in the source application 230. The initial touch input may be a long touch or press gesture indicating the start of the drag event and initiating a creation of a new drag session for the drag event. In at least an implementation, the source application 230 (or any source application) only initiates a drag session through the drag and drop manager 310 and does not have a direct communication channel to the destination application 240 (or any destination application). The drag event also includes a drag gesture moving the item as shown in FIG. 2B, and a touch release at an end of the drag gesture for dropping the item in the destination application 240 as shown in FIG. 2C. The drag session is assigned a drag session identifier, which is used in some instances as further explained herein to associate new drag touches. An item (or data item), as used herein, may refer to a file, content within a file, group of files, text, an application, or other object that includes data or a link to data (local or cloud based). Such an item may be selected as part of a drag and drop operation and included as part of an associated drag session. Further, each item (or data item) may be assigned its own unique item identifier that may be used to identify the item during a drag session.

As mentioned above, multiple drag sessions are supported by the drag and drop manager 310. A drag event associated with the source application 235 and the destination application 245 as described before by reference to FIGS. 2K and 2L may be assigned a corresponding drag session identifier for a separate drag session. The source application 235 (or any source application) only initiates a drag session through the drag and drop manager 310 and does not have a direct communication channel to the destination application 245 (or any destination application). With reference to FIG. 2K, the drag event associated with source application 235 includes an initial touch input (e.g., a long touch gesture indicating a start of a drag event and initiation of a new drag session) selecting an item (e.g., the image 282 which may be associated with a unique item identifier) in the source application 235. The drag event also includes a drag gesture moving the item and a touch release at an end of the drag gesture for dropping the item in the destination application 245 as shown in FIG. 2L.

The drag and drop architecture 300 includes a touch event manager 320 that is configured to manage touch events when received through the drag and drop architecture 300. The touch event manager 320 may be implemented as a background process (e.g., daemon) executing on the electronic device 110 and is configured to receive all touch inputs coming into the subject system. The touch event manager 320, for example, can detect an initial touch input indicating a start of a drag event in a given source application (e.g., a long touch gesture in the source application 230 or 235) and forward the touch input to the drag and drop manager 310 for processing and creating a new drag session and its associated drag session identifier. Upon detection of the long touch gesture associated with the initiation of the drag session, the touch event manager 320 may cancel (or forgo processing) other current touch inputs in the source application that are received. In an example, a hierarchy for touch inputs may prioritize the long touch gesture for initiating the drag session over other types of touch gestures that may be received during the drag session and the touch event manager 320 may delay the processing of these other touches until detection of a touch release that corresponds with dropping the item into the destination application 240. In another example, the hierarchy for touch inputs may prioritize a long touch or press gesture such that this gesture overrides another gesture.

The touch event manager 320 can receive a request from the drag and drop manager 310 to generate a copy of the drag event in the form of a specialized drag event, or a detached drag event, that coexists with the drag event. The specialized drag event is provided to the drag and drop manager 310, which is further configured to manage the specialized drag event and receive new drag touches through the specialized drag event (e.g., corresponding to the new drag session). These new drag touches may be associated with the drag session identifier of the drag session. In one or more implementations, the touch event manager 320 provides an interface that utilizes interprocess communication (IPC) for the drag and drop manager 310 to supply touch inputs associated with a particular drag session identifier.

During the drag session, when touch inputs are received that have been flagged with the drag session identifier, the touch event manager 320 is also configured to perform hit testing of the drag event to determine whether the destination application 240 (or any destination application) is configured and/or authorized to receive the item from the drag event. Hit testing, as mentioned herein, refers to an operation for determining whether a location of a current touch input on the touchscreen of the electronic device 110 (or any electronic device) intersects a corresponding application on the screen. In at least an implementation, each touch input is hit tested to determine a corresponding application as a potential destination application for a dropped item. The hit testing may be rate limited to mitigate potential performance issues to the drag and drop architecture 300 and/or the electronic device 110. In an implementation, the touch event manager 320 may determine, based on the drag session identifier, respective locations of all touches for the drag session, compute a centroid of the locations of the touches, and perform hit testing on the location of the centroid to determine a potential destination application for a dropped item.

In one or more implementations, the touch event manager 320 associates a new unique identifier with a touch path of a given drag event and verifies that newly received touch inputs that are part of the drag event match existing touch inputs known to the touch event manager 320 using the new unique identifier. During the drag session, the touch event manager 320 may forward touch inputs flagged with the drag session identifier to the drag and drop manager 310, the source application 230 and/or the destination application 240. In one or more implementations, when receiving a touch input associated with the drag session identifier, the destination application 240 requests an XPC connection (e.g., a type of interprocess communication mechanism with sandbox features) with the drag and drop manager 310. The XPC connection may provide a sandbox environment, limiting the type of accessible information, for the destination application 240 to communicate with the drag and drop manager 310. For example, the drag and drop manager 310 will not release any data regarding one or more representations of the item until the drag event has ended.

Upon a touch release by the user's finger 270 at the end of drag gesture (indicating the end of the drag event) shown in FIG. 2C, the touch event manager 320 notifies the drag and drop manager 310 and the destination application 240.

Using the touch event manager 320 to deliver touch events to the drag and drop manager 310 and the destination application 240 (or any destination application) advantageously enables the drag and drop manager 310 and the destination application 240 (or any destination application) to receive touch events with minimal latency (e.g., at effectively the same time). Further, synchronization with other touch events received by the destination application 240 (or any destination application) is provided to enable the destination application 240 to behave normally for any additional touch inputs that are not part of the drag event.

The drag and drop manager 310 may be configured to notify the destination application 240 that the drag event has ended and that the item may be dropped into the destination application 240, if accepted for receipt by the destination application 240. In one or more implementations, the destination application 240 may indicate to the drag and drop manager 310 that it wishes to receive the dropped item. For example, the drag and drop manager 310 may receive a request from the destination application 240 for information corresponding to the item associated with the drag event. The request may include, for example, the drag session identifier.

The drag and drop manager 310 may request additional information regarding the item from the source application 230, such as a list of available representations of the item. For example, each representation may be a different digital version of the item and the list may be sorted in an order of fidelity or level of quality. The drag and drop manager 310 may receive the additional information corresponding to the item from the source application 230 and may provide the additional information corresponding to the item to the destination application 240. The destination application 240 can then utilize the received additional information to initiate a data transfer for a particular representation of the item, which is discussed further below with respect to FIG. 4A.

The drag and drop manager 310 controls the flow of information to any destination application, and any request by the destination application may not be fulfilled until the drag and drop manager 310 has determined that the request should be allowed.

In one or more implementations, as a security feature the drag and drop architecture 300 may provide the destination application 240 with minimal or no information regarding the item being dragged until after the drag and drop architecture 300 verifies that the destination application 240 is authorized/configured to receive the item being dragged, and/or after the destination application 240 accepts receipt of the item being dragged. Accordingly, during the drag session the destination application 240 may be aware that an item is being dragged over it, but the destination application 240 may not have access to any specific information regarding the item being dragged.

Figure 4A:
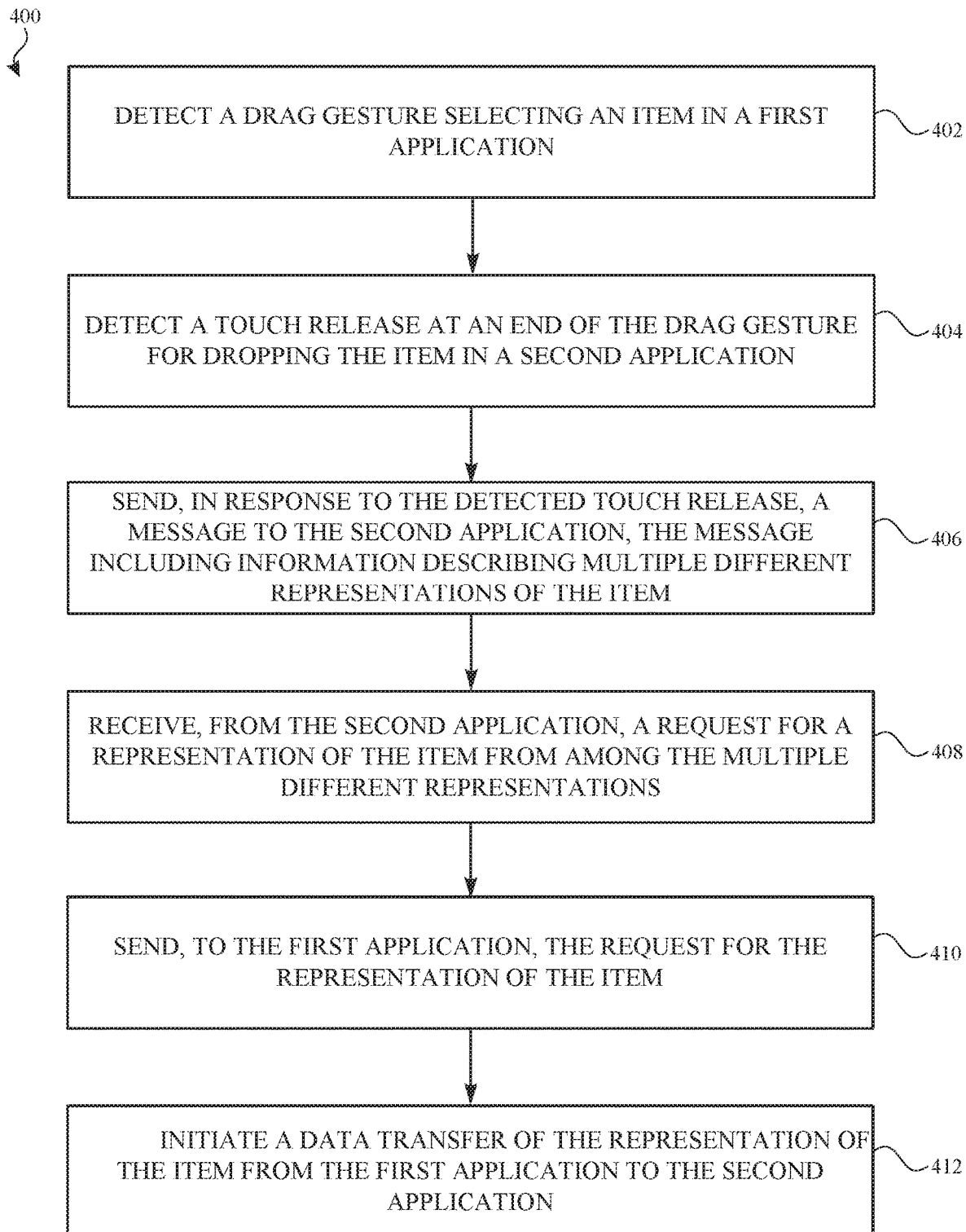
FIG. 4A illustrates a flow diagram of an example process for performing a data transfer as part of a drag and drop operation on an electronic device that includes a touchscreen in accordance with one or more implementations.

FIG. 4A illustrates a flow diagram of an example process 400 for performing a data transfer as part of a drag and drop operation on an electronic device 110 that includes a touchscreen in accordance with one or more implementations. For explanatory purposes, the process 400 is primarily described herein with reference to the electronic device 110 of FIGS. 1 and 2, particularly with reference to the drag and drop manager 310 described above in FIG. 3. However, the process 400 is not limited to the electronic device 110 of FIGS. 1 and 2, and one or more blocks (or operations) of the process 400 may be performed by one or more other components of other suitable devices. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

As described in FIG. 3, the drag and drop manager 310 provides a mechanism to limit communication, during a drag session, between the source application 230 and the destination application 240 until a data transfer is initiated for the item that was dropped into the destination application 240. In this manner, the source application 230 and the destination application 240 communicate with the drag and drop manager 310 directly but not with each other until the data transfer is initiated.

As illustrated in FIG. 4A, the drag and drop manager 310 detects a drag gesture selecting an item in a first application (402). The selected item may be the image 220 in the source application 230 in FIG. 2A. The drag and drop manager 310 detects a touch release at an end of the drag gesture for dropping the item in a second application (404). The second application may be the destination application 240 where the item is dropped in as shown in FIG. 2C. In an implementation, as a security feature, the drag and drop manager 310 may check a process identifier (ID) of the destination application to ensure that the touch release associated with the drag event of the drag session corresponds to the expected destination application.

The drag and drop manager 310 sends, in response to the detected touch release, a message to the second application, the message including information describing multiple different representations of the item (406). For example, the source application 230 may provide a list including multiple representations of the image 220 in varying degrees of fidelity or quality (e.g., original image, PDF, PNG, JPG, plain text, etc.). Each representation in the list can be indicated in the form of a uniform type identifier (UTI), which is a respective text string to uniquely identify a given class or type of item. In one or more implementations, a destination application (e.g., the destination application 240) is responsible for providing UTI conformance information to indicate which representations of the item that the destination application may accept. An XPC connection established between the drag and drop manager 310 and the destination application 240 may be utilized to send the message including information describing the representations of the item.

To provide additional flexibility, in one or more implementations, the drag and drop architecture 300 provides a service that maps a file to a file type as specified in a corresponding UTI. A given application can utilize the service to register a new UTI or file type, and the application can also extend an existing UTI or tile type (e.g., to associate with other file(s)) using the service.

The drag and drop manager 310 receives, from the second application, a request for a representation of the item from among the multiple different representations (408). Although a single requested representation is discussed, it is appreciated that the destination application 240 may also request multiple representations of the item. In an example, the destination application 240 may choose a particular representation with the highest degree of fidelity provided by the source application 230. In another example, the representation of the item that is requested depends on context (e.g., a destination application that will be graphically rendering the received representation may choose a different representation than another destination application that will not be graphically rendering the received representation).

The drag and drop manager 310 sends, to the first application, the request for the representation of the item (410). The drag and drop manager 310 initiates a data transfer of the representation of the item from the first application to the second application (412). In an implementation, during the drag session, the drag and drop manager 310 may have a connection with the source application 230. However, the connection is not provided to the destination application 240 until after the drag session is completed in order to prevent an unauthorized or unintended data transfer from occurring, a security feature which is enabled by the drag and drop architecture 300 of FIG. 3. In an example in which the source application 230 is not executing (e.g., crashed or is no longer running), the drag and drop manager 310 may end the drag session and/or cancel the data transfer.

After the drag and drop manager 310 detects that the touch release has occurred, and the destination application 240 has requested the representation of the item, the drag and drop manager 310 may provide the connection (or an extension to an endpoint of the connection) to the destination application 240 to perform the data transfer of the representation of the item. In an implementation, as a security feature, the drag and drop manager 310 may also set a timeout for the data transfer to be completed and enforce the timeout (e.g., by closing the connection and/or stopping the data transfer) to prevent a long data transfer from occurring. The drag and drop manager 310 may detect when the data transfer is completed, and may tear down the connection between the source application 230 and the destination application 240 at that time.

During the data transfer, the drag and drop manager 310 may provide a placeholder preview that is a graphical representation indicating or showing a progression of the data transfer. After the data transfer is complete, the representation of the item may be displayed replacing the placeholder preview. An animation may be implemented that morphs the placeholder preview into the representation of the item.

Additionally, one or more other implementations for performing the data transfer may be provided. While the data transfer is occurring, the source application 230 may be placed into the background and over time could be restricted from accessing resources provided by the drag and drop architecture 300 which would negatively impact the data transfer. Further, data transfers for large files or files located on the network 106, e.g. on the server 120, may take a long period of time to complete.

To alleviate such issues, for example, a file provider may be provided to handle the data transfer. A file provider may be an extension (e.g., a non-UI background process or daemon) that provides files or data, and can be used to open documents from other containers (e.g., where files or data are stored, such as locally or on the server 120). In an implementation, the file provider may be included in a sandbox environment as a security feature.

Figure 4B:
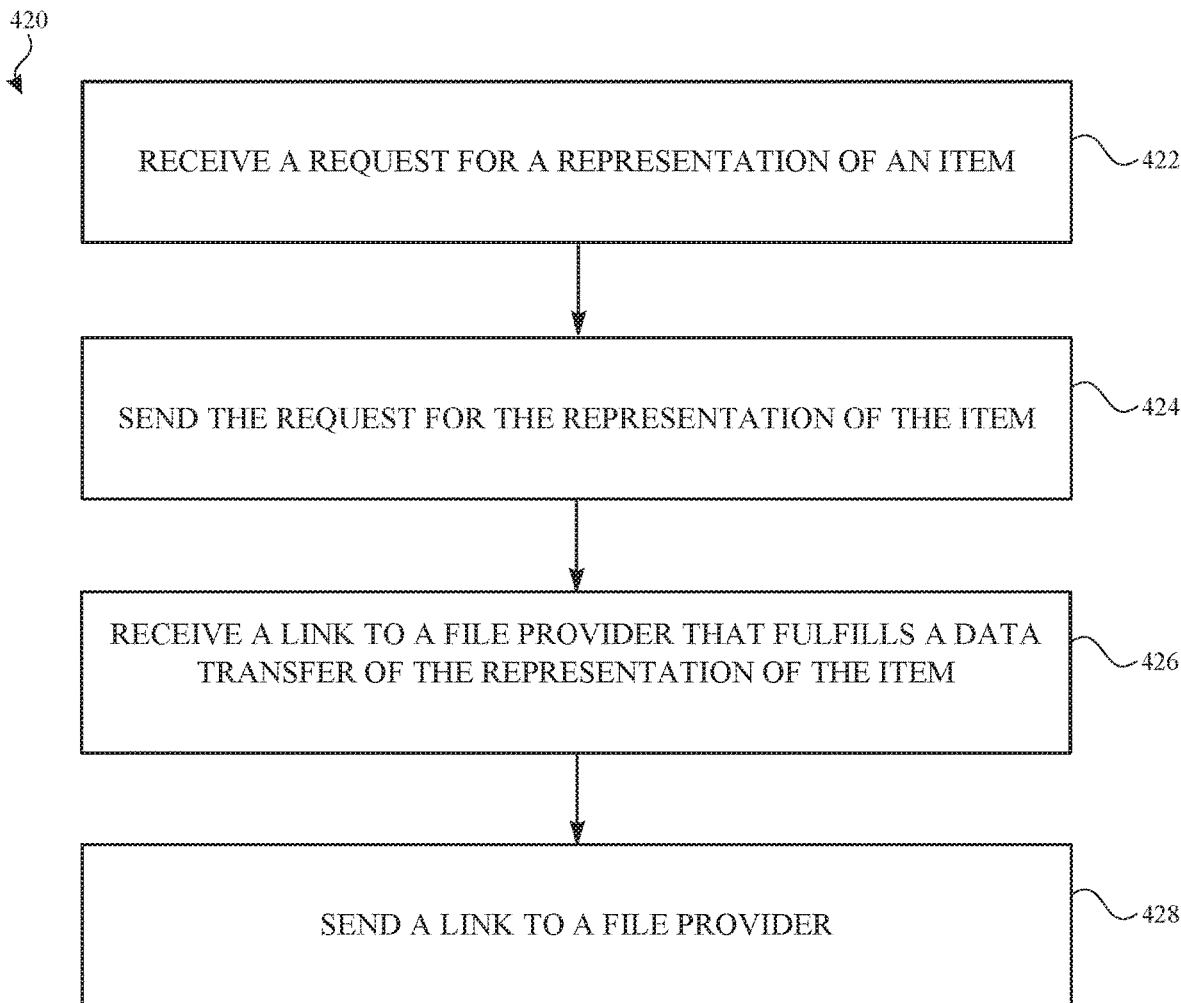
FIG. 4C illustrates a flow diagram of an example process for adding an item to an existing drag session on the electronic device that includes a touchscreen in accordance with one or more implementations.
FIG. 4D illustrates a flow diagram of an example process for removing an item from an existing drag session on the electronic device that includes a touchscreen in accordance with one or more implementations.

FIG. 4B illustrates a flow diagram of an example process 420 for using a file provider to fulfill a data transfer as part of a drag and drop operation on the electronic device 110 that includes a touchscreen in accordance with one or more implementations. For explanatory purposes, the process 420 is primarily described herein with reference to the electronic device 110 of FIGS. 1 and 2, particularly with reference to the drag and drop manager 310 described above in FIG. 3. However, the process 420 is not limited to the electronic device 110 of FIGS. 1 and 2, and one or more blocks (or operations) of the process 420 may be performed by one or more other components of other suitable devices. Further for explanatory purposes, the blocks of the process 420 are described herein as occurring in serial, or linearly. However, multiple blocks of the process 420 may occur in parallel. In addition, the blocks of the process 420 need not be performed in the order shown and/or one or more blocks of the process 420 need not be performed and/or can be replaced by other operations.

The drag and drop manager 310 receives a request for a representation of an item (422). The drag and drop manager 310 sends a request for the representation of the item to the source application 230 (424). In response to the request for a particular representation of the item, the source application 230 can provide, to the drag and drop manager 310, a URL or link to a file provider that fulfills a data transfer of the representation of the item. The drag and drop manager 310 receives this URI, or link to the file provider that fulfills a data transfer of the representation of the item (426). The drag and drop manager 310 can then send, to the destination application 240, this URI or link to the file provider (428). Subsequently, the destination application 240 can request the file or data from the file provider via the URL. Advantageously, the drag and drop manager 310 may end the drag session at this time and rely on the file provider to complete the data transfer for the requested data. The file provider, in response to the request from the destination application 240, can initiate a data transfer to the destination application 240 for the requested representation of the item.

In one or more implementations, the drag and drop manager 310 may create an access control list (ACL) in a database of the file provider to indicate a specific pair of processes (e.g., the source application 230 and the destination application 240) that share and/or can access specific file(s). The file provider may then check the ACL after receiving the request from the destination application 240 for that specific file to ensure that access is permitted to the file. In an implementation, a file coordination process (e.g., daemon or background process) may be provided to monitor the state of the data transfer, and notify when transfer is complete, or when one of the processes crashes, to the file provider. Once notified that the data transfer is complete, the file provider removes the ACL from the file provider database.

In one or more implementations, support is provided for editing in place a remote (or cloud) file or document that is located over the network 106 (e.g., on the server 120 or otherwise not local to the electronic device 110). This example provides coordination with the file provider to upload changes back to the server 120, or to a network or cloud of computers that includes the server 120. The destination application 240 can request to open the cloud file in place. The destination application 240 may receive a reference to the requested cloud file and make changes via the reference to the cloud file. The file provider may collect these changes and upload the changes back to the cloud to update the cloud file with the changes.

In one or more implementations, the drag and drop architecture 300 supports policy creation for excluding a destination application from receiving any dropped items and/or from receiving one or more specific types of dropped items. For example, data may be prevented from moving between a particular source application and a particular destination application. Further, certain policies may be provided to enable allowing drag and drop between only managed apps (e.g. in an enterprise configuration). In an implementation, such policies can be enforced by the drag and drop manager 310 based on information indicating that the source and destination applications are in the same managed configuration. Further, the source application may control how much and which metadata (e.g., information related to representations of an item) to expose to other apps with respect to a drag event. For a third party application, an entitlement check using an entitlement key and code sign may be provided to determine access to a dropped item.

The drag and drop architecture 300 provides support for adding and/or removing an item from an existing drag session. As mentioned above, each drag session may be assigned a drag session identifier, and each item included in a drag session may also be assigned its own unique identifier. The following discussion relates to an example process 430 for adding an item to an existing drag session, and an example process 440 for removing an item from an existing drag session.

Figure 4C:
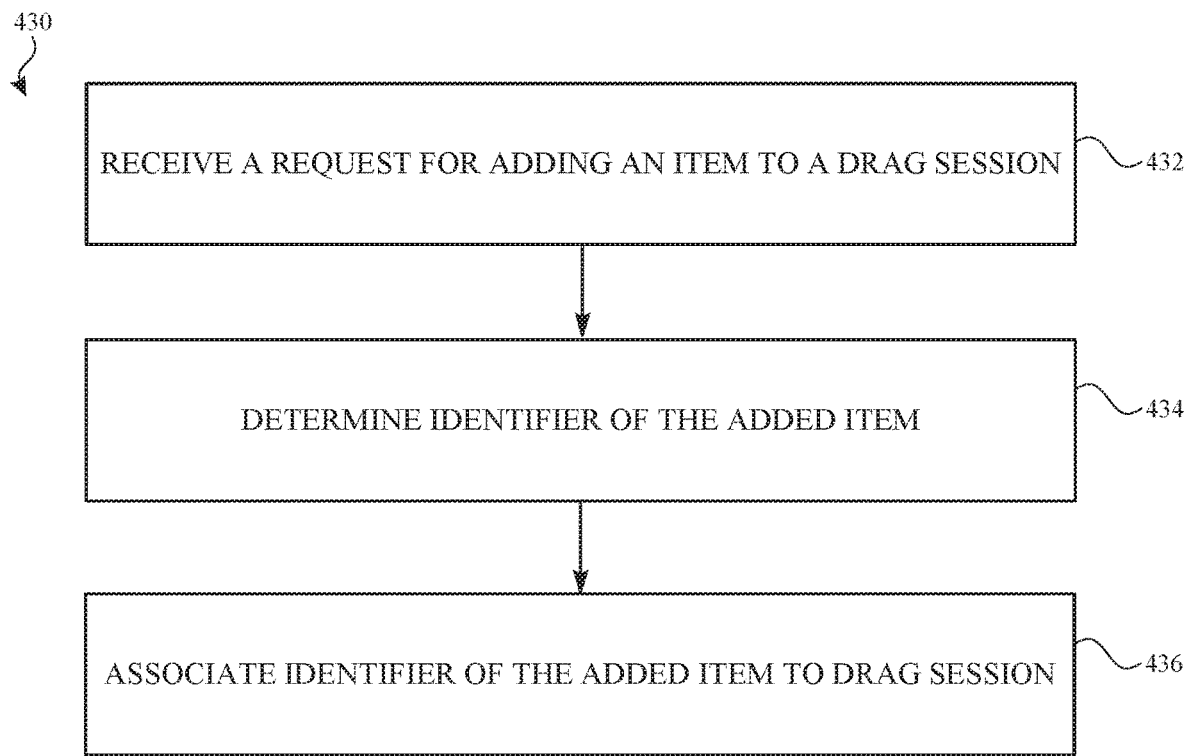

FIG. 4C illustrates a flow diagram of an example process 430 for adding an item to an existing drag session on the electronic device 110 that includes a touchscreen in accordance with one or more implementations. For explanatory purposes, the process 430 is primarily described herein with reference to the electronic device 110 of FIGS. 1 and 2, particularly with reference to the drag and drop manager 310 described above in FIG. 3. However, the process 430 is not limited to the electronic device 110 of FIGS. 1 and 2, and one or more blocks (or operations) of the process 430 may be performed by one or more other components of other suitable devices. Further for explanatory purposes, the blocks of the process 430 are described herein as occurring in serial, or linearly. However, multiple blocks of the process 430 may occur in parallel. In addition, the blocks of the process 430 need not be performed in the order shown and/or one or more blocks of the process 430 need not be performed and/or can be replaced by other operations.

During a drag session, the drag and drop manager 310 receives a request for adding an item to a drag session (432). The request for adding the item to the drag session may be from the source application 230 in FIG. 2D, and may also include a drag session identifier associated with the drag session. The request may occur after, with reference to FIG. 2D, the drag session has already been initiated with respect to the image 220, and the touch input (e.g., a tap gesture) for selecting the image 225 is received by the source application 230, which interprets this touch input as a request to add the selected image 225 to the drag session.

The drag and drop manager 310 determines an identifier of the added item (434). In an implementation, each item provided by the source application 230 is associated with a unique identifier, and this unique identifier may be included as part of the request from the source application 230 to add this item to the drag session.

The drag and drop manager 310 associates the identifier of the added item to the drag session (436). In an implementation, the drag session may include a data structure (e.g., an array or list, etc.) corresponding to one or more items that are included in the drag session. The drag and drop manager 310 may insert or include the identifier of the added item in such a data structure.

Figure 4D:
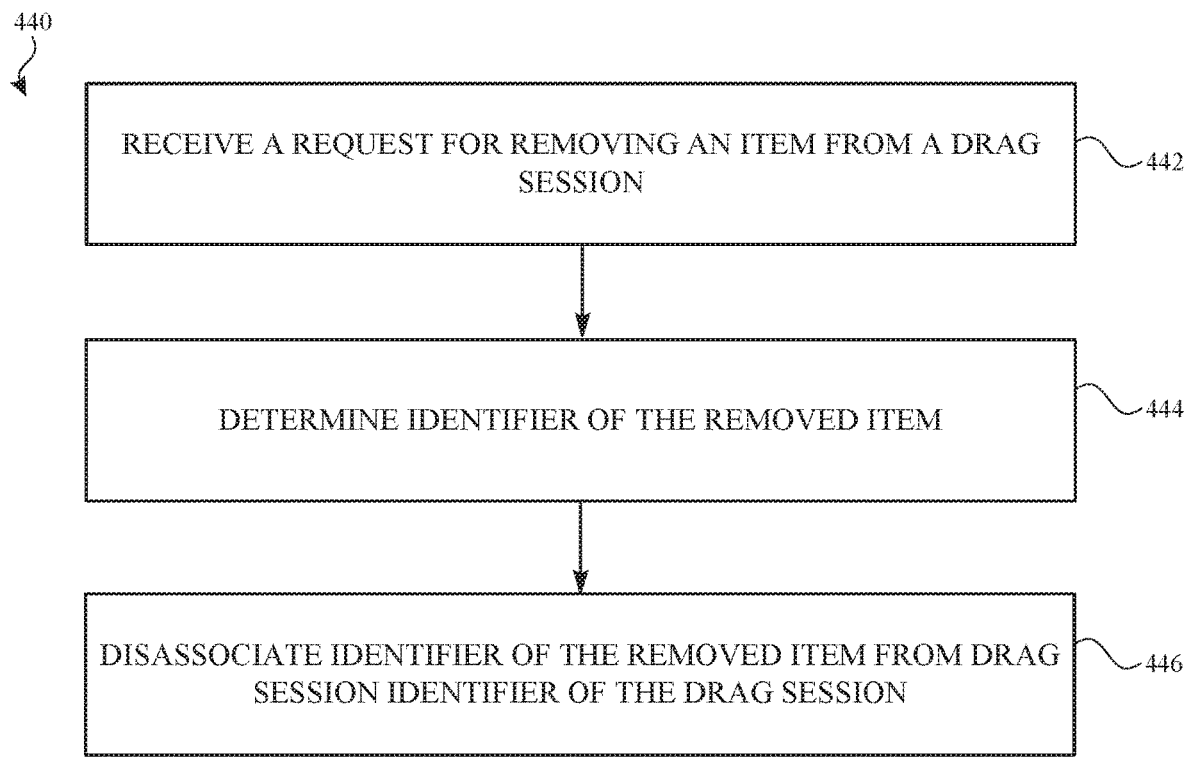

FIG. 4D illustrates a flow diagram of an example process 440 for removing an item from an existing drag session on the electronic device 110 that includes a touchscreen in accordance with one or more implementations. For explanatory purposes, the process 440 is primarily described herein with reference to the electronic device 110 of FIGS. 1 and 2, particularly with reference to the drag and drop manager 310 described above in FIG. 3. However, the process 440 is not limited to the electronic device 110 of FIGS. 1 and 2, and one or more blocks (or operations) of the process 440 may be performed by one or more other components of other suitable devices. Further for explanatory purposes, the blocks of the process 440 are described herein as occurring in serial, or linearly. However, multiple blocks of the process 440 may occur in parallel. In addition, the blocks of the process 440 need not be performed in the order shown and/or one or more blocks of the process 440 need not be performed and/or can be replaced by other operations.

During a drag session, the drag and drop manager 310 receives a request for removing an item from a drag session (442). The request for removing the item to the drag session may be from the source application 230 in FIG. 2D, and may also include a drag session identifier associated with the drag session. The request may occur after, with reference to FIG. 2D, the drag session has already been initiated with respect to the image 220, and the image 225 has been added to the drag session as shown in FIG. 2E. In an implementation, the source application 230 may receive a touch input (e.g., a type of gesture) for removing the added item corresponding to the image 225. The source application 230 may interpret this touch input as a request to remove the selected image 225 from the drag session.

The drag and drop manager 310 determines an identifier of the item requested for removal (444). In an implementation, each item provided by the source application 230 is associated with a unique identifier, and this unique identifier may be included as part of the request from the source application 230 to remove this item from the drag session.

The drag and drop manager 310 disassociates the identifier of the item requested for removal from the drag session (446). In an implementation, the drag session may include a data structure (e.g., an array or list, etc.) corresponding to one or more items that are included in the drag session. The drag and drop manager 310 may remove the identifier of the item in such a data structure.

Figure 5:
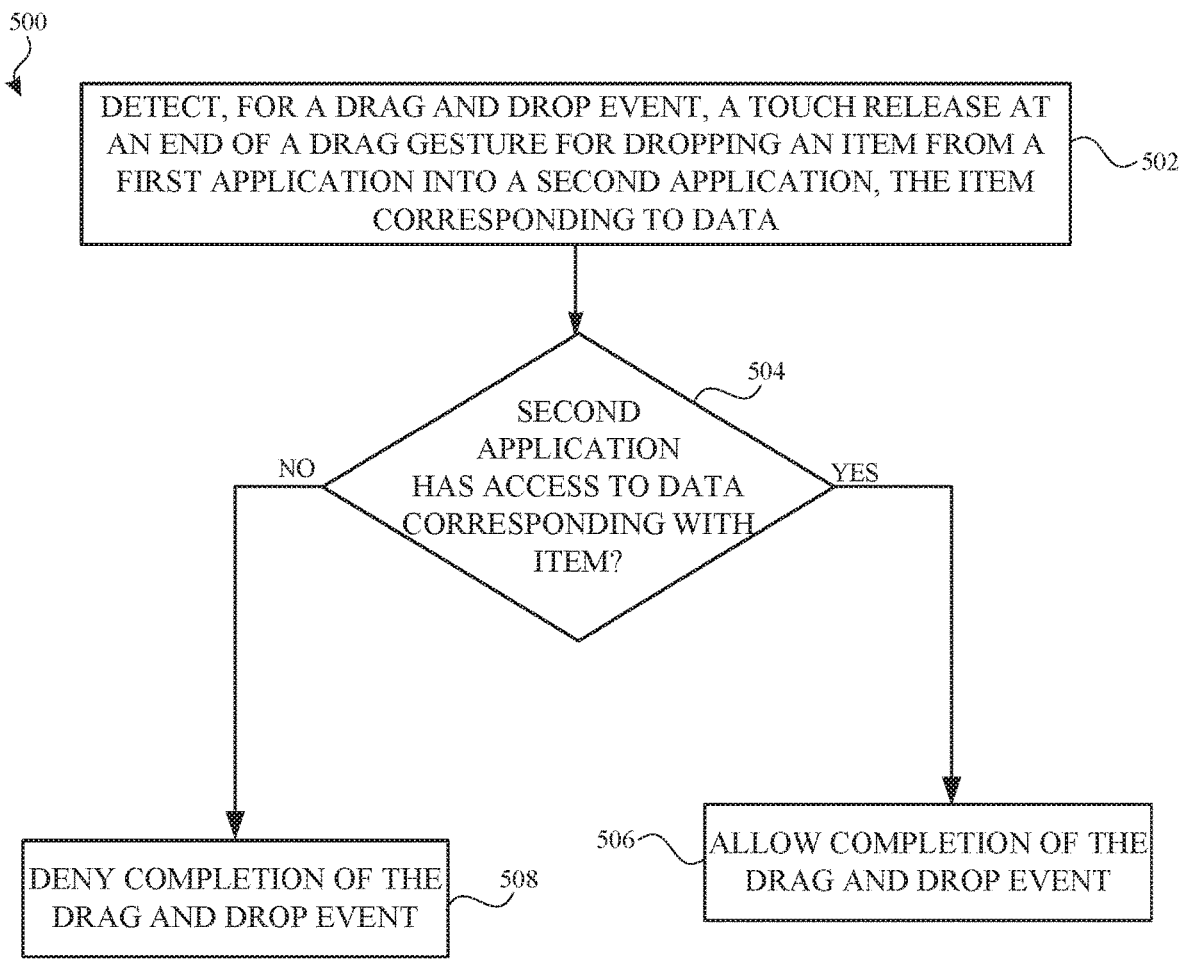
FIG. 5 illustrates a flow diagram of an example process for implementing a security policy for a drag and drop operation on an electronic device that includes a touchscreen in accordance with one or more implementations.

FIG. 5 illustrates a flow diagram of an example process 500 for implementing a security policy for a drag and drop operation on an electronic device 110 that includes a touchscreen in accordance with one or more implementations. For explanatory purposes, the process 500 is primarily described herein with reference to the electronic device 110 of FIGS. 1 and 2, particularly with reference to the drag and drop manager 310 described above in FIG. 3. However, the process 500 is not limited to the electronic device 110 of FIGS. 1 and 2, and one or more blocks (or operations) of the process 500 may be performed by one or more other components of other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The drag and drop manager 310 detects, for a drag and drop event, a touch release at an end of a drag gesture for dropping an item from a first application into a second application, the item corresponding to data (502). The first application may be the source application 230 and second application may be the destination application 240 where the image 220 is dropped into as shown in FIG. 2C.

The drag and drop manager 310 determines, using a data access policy, whether the second application has access to data corresponding with the item (504). The data corresponding to the item may be, for example, and image file, a video tile, a sound file, etc. For example, the data access policy may only allow access to the data corresponding to the item between managed applications. The drag and drop manager 310 therefore determines that the source application 230 and the destination application 240 are both managed applications (e.g., under the same enterprise configuration), and allows access to the item.

In an implementation, a drag and drop operation may be enabled only between apps having views associated with a same account type. In particular, depending on the current view of the destination app, a determination is made whether the view is associated with a managed or unmanaged account, and then determining whether drag events will be sent to the destination app based on whether item being dragged is associated with a same type of account and/or is being dragged from a view associated with the same type of account.

If the drag and drop manager 310 determines that the second application has access to the data corresponding with the item (504), the drag and drop manager 310 allows the drag and drop event to be completed (506). For example, the drag and drop manager 310 may facilitate the data transfer of the data corresponding with the item, such as is discussed above with respect to FIG. 4.

If the drag and drop manager 310 determines that the second application does not have access to the data corresponding with the item (504), the drag and drop manager 310 denies completion of the drag and drop event (508). The access may be denied when both the source application 230 and the destination application 240 are not managed applications and/or the item being dragged is not associated with same type of account and/or is being dragged from a view not associated with the same type of account. After denying completion of the drag and drop event, the drag and drop manager 310 may end the drag session associated with the drag and drop event.

Figure 6A:
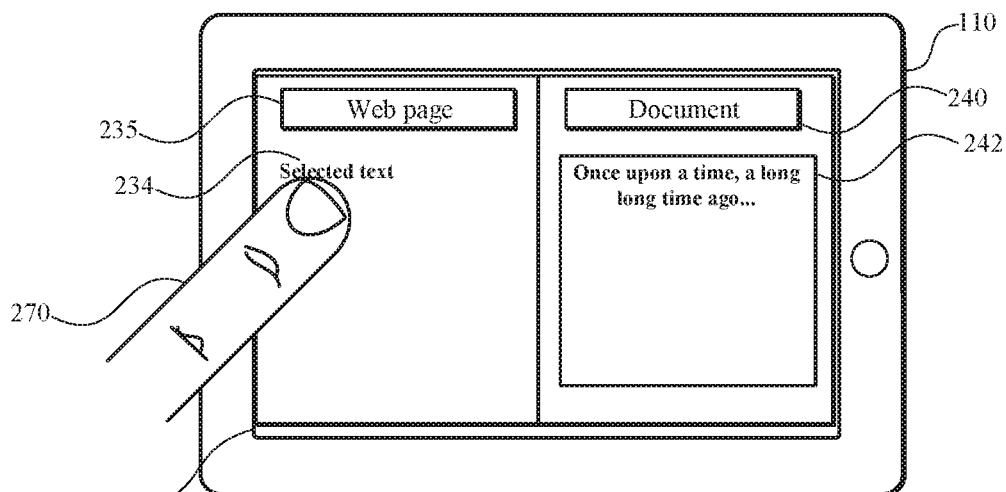
FIGS. 6A-6C illustrate an example drag and drop operation for a text selection performed on an electronic device that includes a touchscreen in accordance with one or more implementations.
Figure 6B:
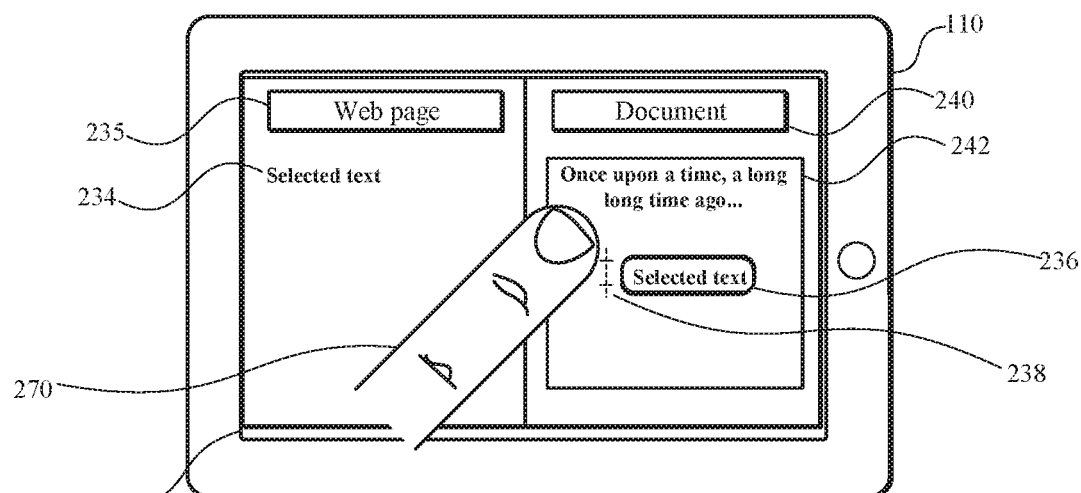
Figure 6C:
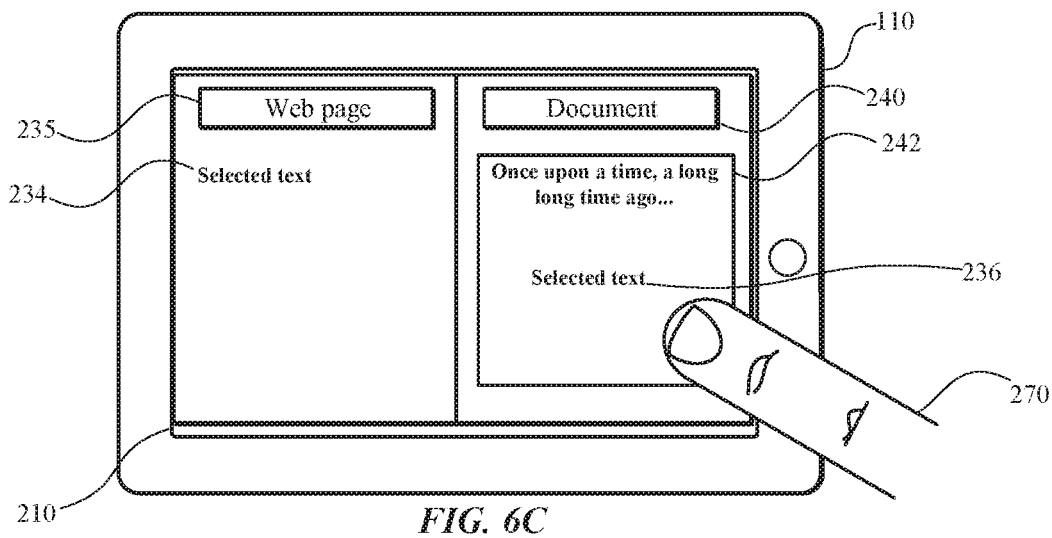

FIGS. 6A-6C illustrate an example drag and drop operation for a text selection performed on an electronic device 110 that includes a touchscreen in accordance with one or more implementations. For explanatory purposes, the example drag and drop operation illustrated in FIGS. 6A-6C is described as being performed on the electronic device 110 of FIG. 1, and also with reference to the drag and drop manager 310 described above in FIG. 3. However, the example drag and drop operation illustrated in FIGS. 6A-6C may be performed on any electronic device that includes a touchscreen.

As illustrated in FIG. 6A, the touchscreen 210 of the electronic device 110 may concurrently display two different applications that may be referred to as the source application 235 and the destination application 240.

The electronic device 110 may detect an initial touch input (e.g., a long touch gesture) based on a user's finger 270 touching the touchscreen 210 of the electronic device 110 that initiates a drag session. For example, a touch input may be detected based on a user's finger 270 touching text 234 displayed in the source application 235. While the user's finger 270 is still in contact with the touchscreen 210, the electronic device 110 may detect another touch input (e.g., a swipe gesture) selecting the text 234 to be part of the drag session, in some instances, a second touch input may not be required to select certain types of text. For example, the touch input corresponding to the long touch gesture may be utilized to select a hyperlink or URL provided in the source application 235.

In one or more implementations, the electronic device 110 may provide a platter graphical element ("platter") corresponding to a graphical representation of the selected text. The platter, when provided for display, may blur the background as it is being dragged during the drag session. Different representations of the platter may be provided. For example, the platter may be presented with rounded corners, with a shadow, without a shadow, without a border, and/or further customized in any way. In addition, in example in which the selected text may include a large number of selected characters, the platter may truncate a number of characters for providing as part of the presented platter.

As illustrated in FIG. 6B, the electronic device 110 detects a drag gesture caused by the user's finger 270 dragging across the touchscreen 210 of the electronic device 110. The drag gesture drags the selected text 236 (as shown in a platter representation) from the source application 235 to the destination application 240. The example illustrated in FIG. 6B shows the drag session in-progress where the selected text 236 being dragged within a document 242 the destination application 240. The destination application 240 may request to the drag and drop manager 310 for a precision mode which provides a cursor 238 indicating a position in which the selected text will be placed upon a drop in the destination application 240. Further, the drag and drop manager 310 may provide an offset amount for displaying the selected text 236 some position away from a position of a current touch input of the user's finger 270 during the drag session. The offset amount may vary depending on the content provided in the destination application 240 and/or the size of the selected text 236.

As illustrated in FIG. 6C, the electronic device 110 detects the completion of the drag gesture when the user's finger 270 is lifted from the touchscreen 210 of the electronic device 110. In the example of FIG. 6C, the selected text has been inserted into the document 242 of the destination application 240 at a position corresponding to the cursor 238 from FIG. 6B.

Figure 6D:
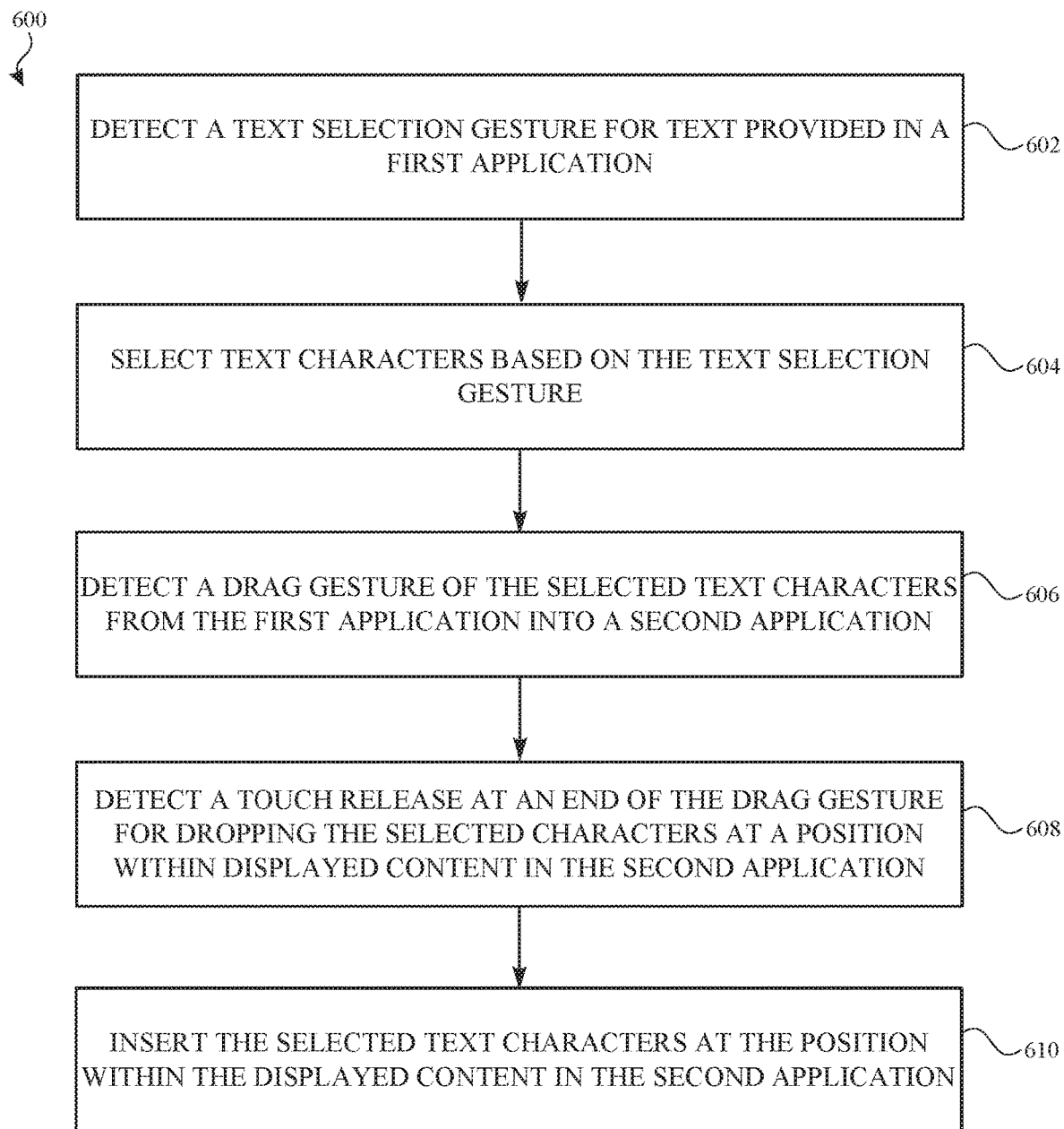
FIG. 6D illustrates a flow diagram of an example process for performing a drag and drop operation for text selected on an electronic device that includes a touchscreen in accordance with one or more implementations.

FIG. 6D illustrates a flow diagram of an example process 600 for performing a drag and drop operation for text selected on an electronic device 110 that includes a touchscreen in accordance with one or more implementations. For explanatory purposes, the process 600 is primarily described herein with reference to the electronic device 110 of FIGS. 1 and 2, particularly with reference to the drag and drop manager 310 described above in FIG. 3. However, the process 600 is not limited to the electronic device 110 of FIGS. 1 and 2, and one or more blocks (or operations) of the process 600 may be performed by one or more other components of other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The drag and drop manager 310 detects a text selection gesture for text provided in a first application (602). For example, the text selection gesture may include one or more text characters provided in the first application. The drag and drop manager 310 selects the text characters for dragging based on the text selection gesture (604). In one or more implementations, if a selection only includes whitespace and one or more images, the drag and drop manager 310 can filter out the whitespace and only the images are selected to be dragged, or if the selection only includes whitespace the drag and drop manager 310 may decide to not select any text characters for dragging. Further, for a selection that includes text characters with markup information, the text characters may selected with markup or without markup by the drag and drop manager 310 depending on implementation.

The drag and drop manager 310 detects a drag gesture of the selected text characters from the first application into a second application (606). In an example, the first application can add to or modify the selected text that is being dragged such that the modified text will be dragged into the second application. For example, the first application may reverse the text or apply some other transformation to the selected text (e.g., transforming the selected text to an image).

The drag and drop manager 310 detects a touch release at an end of the drag gesture for dropping the selected characters at a position within displayed content in the second application (608). The drag and drop manager 310 inserts the selected text characters at the position within the displayed content in the second application (610).

In one or more implementations, the subject system may display a cursor above or below the text that is being dragged. The cursor may be used to indicate the precise location within the content of the second application where the text selection will be dropped. When the cursor is being displayed above the dragged text selection and the text selection is dragged to the bottom of the screen, the system may adaptively flip the cursor to the bottom of the text selection. Similarly, when the cursor is being displayed below the dragged text selection and the text selection is dragged to the top of the screen, the system may adaptively flip the cursor to the top of the text selection.

Figure 7A:
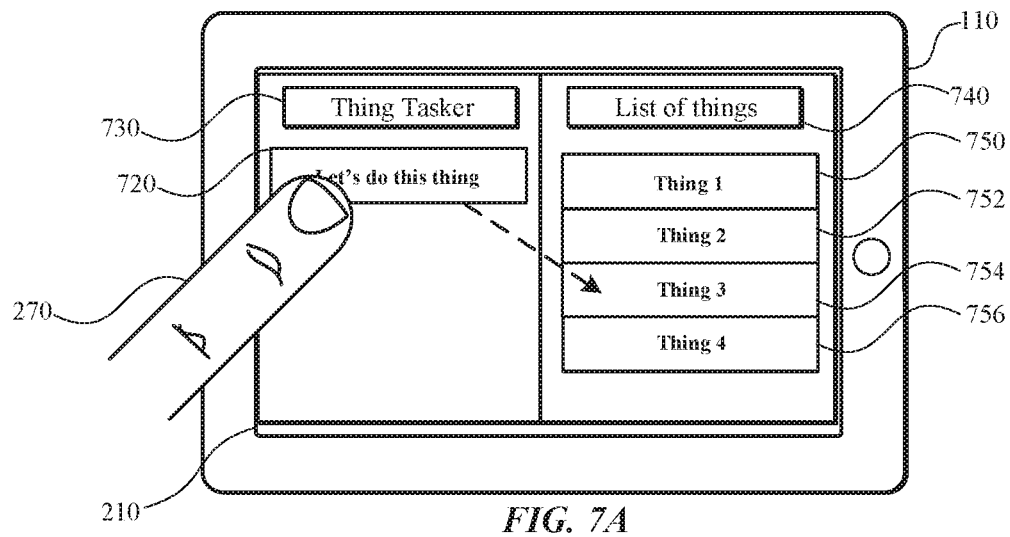
FIGS. 7A-7B illustrate an example drag and drop operation involving a table view that is performed on an electronic device that includes a touchscreen in accordance with one or more implementations.
Figure 7B:
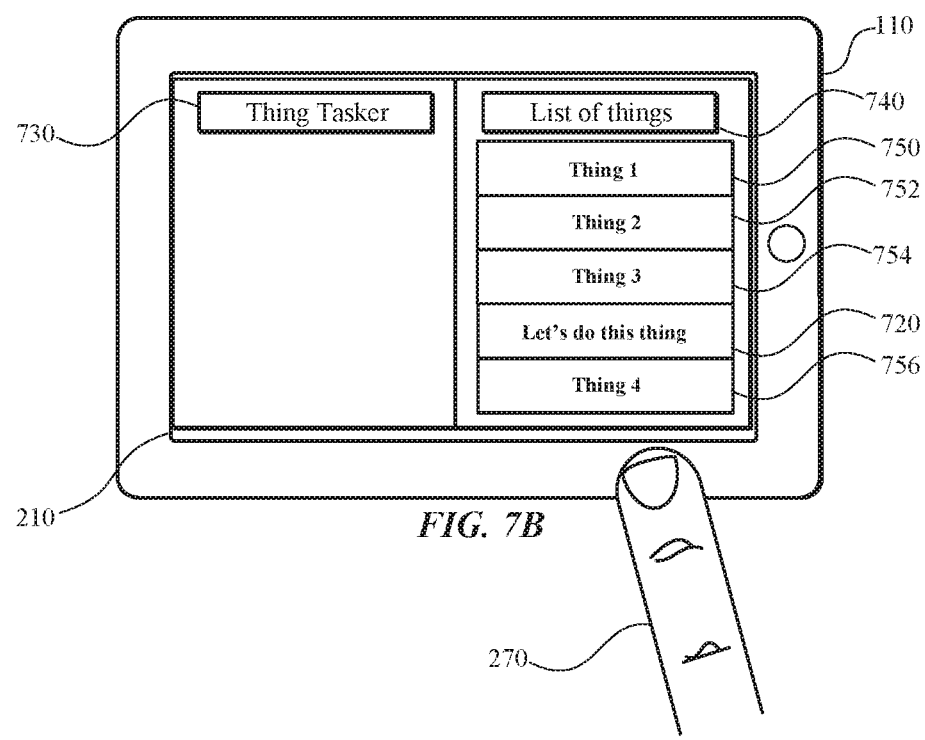

FIGS. 7A-7B illustrate an example drag and drop operation involving a table view that is performed on an electronic device 110 that includes a touchscreen in accordance with one or more implementations. For explanatory purposes, the example drag and drop operation illustrated in FIGS. 7A-7B is described as being performed on the electronic device 110 of FIG. 1. However, the example drag and drop operation illustrated in FIGS. 7A-7B may be performed on any electronic device that includes a touchscreen.

As illustrated in FIG. 7A, the electronic device 110 may detect an initial touch input based on a user's finger 270 touching a touchscreen 210 of the electronic device 110. The electronic device 110 may detect that the user's finger 270 has touched an item 720 provided in a source application 730 (e.g., a productivity application or any application) to be part of a drag session for a drag and drop operation. A destination application 740 (e.g., a to-do list manager application or any application) is provided in a split-screen view where both the source application 730 and destination application 740 are shown side by side on the touchscreen 210. As shown, the destination application 740 provides, in a table view, a list of items including items 750, 752, 754, and 756.

The electronic device 110 detects a drag gesture based on the user's finger 270 moving across the touchscreen 210 of the electronic device 110. The drag gesture may include moving the item 720 to a position within the table view of the list of items provided in the destination application 740. As illustrated in FIG. 7B, the electronic device 110 detects that the drag gesture is complete when the electronic device 110 detects that the user's finger 270 has been lifted from the touchscreen 210 of the electronic device 110.

Upon completion of the drag gesture, the item 720 has been moved (or copied) from the source application 730 and inserted into the table view of the destination application 740 with the items 750, 752, 754, and 756. In particular, the item 720 has been inserted between the item 754 and the item 756 in in the list of items. The drag session has now completed. In one or more implementations, when inserting the item into the table view, the electronic device 110 may implement the state reconciliation of the process discussed below with respect to FIG. 9 in order to account for any changes in state between the time when the item was first moved over the destination application 740 until the time that the item was dropped into the table view of the destination application 740.

In one or more implementations, if the item corresponds to a large file or if the item corresponds to a file being transferred from a remote location, such as the server 120, a placeholder image may be inserted into the location within the table view where the item was released until the transfer or the download of the file is completed. The placeholder image may indicate to the user that the file is still being transferred or downloaded. For example, the placeholder image may be, and/or may include, a progress bar that indicates the progress of the transfer or download.

In one or more implementations, the destination application may determine that the position within the table view at which the user dropped the item is not an appropriate position for inserting the item. For example, the table view may be sorted by a particular factor, such as alphabetically, and the user may have dropped the item at a position within the table view that is not consistent with the alphabetical sorting. In this instance, the destination application may retarget the item to an appropriate position within the table view, and the item may automatically move, and be inserted into, the appropriate position within the table view. In an implementation, during the retargeting of the item, a graphical representation of a "hole" at the position within the table view that the item would be inserted into may be displayed in the destination application, and when drop occurs the item would be animated as moving to the hole at the position within the table view.

Figure 8A:
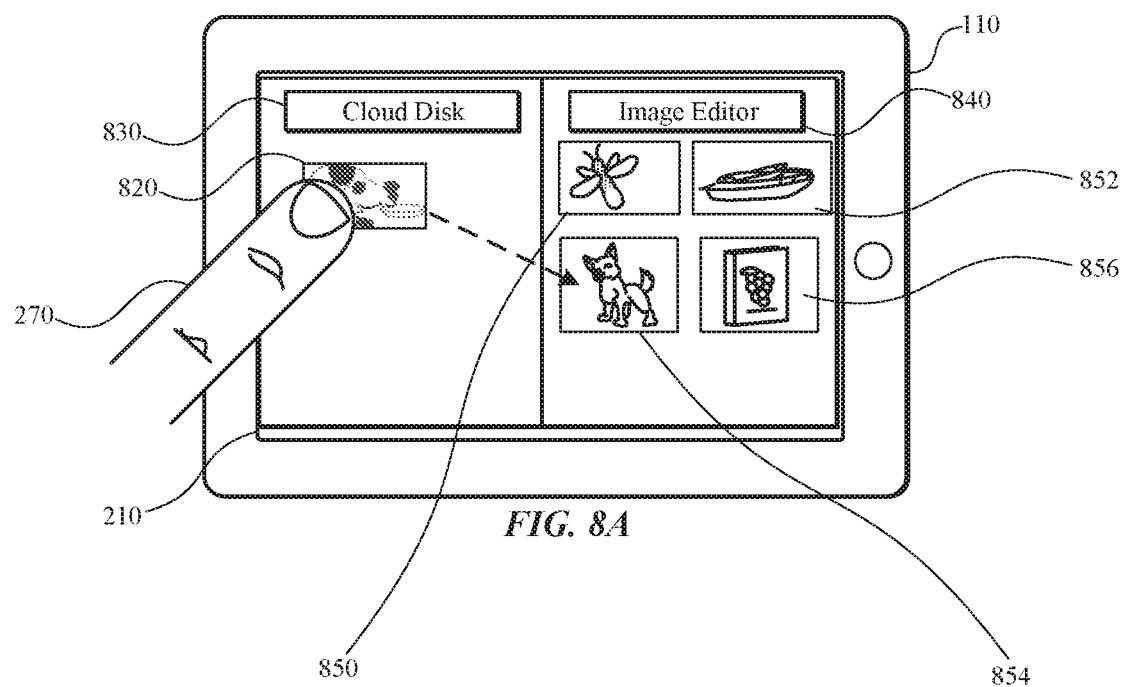
FIGS. 8A-8B illustrate a drag and drop operation involving a collection view that is performed on an electronic device that includes a touchscreen in accordance with one or more implementations.
Figure 8B:
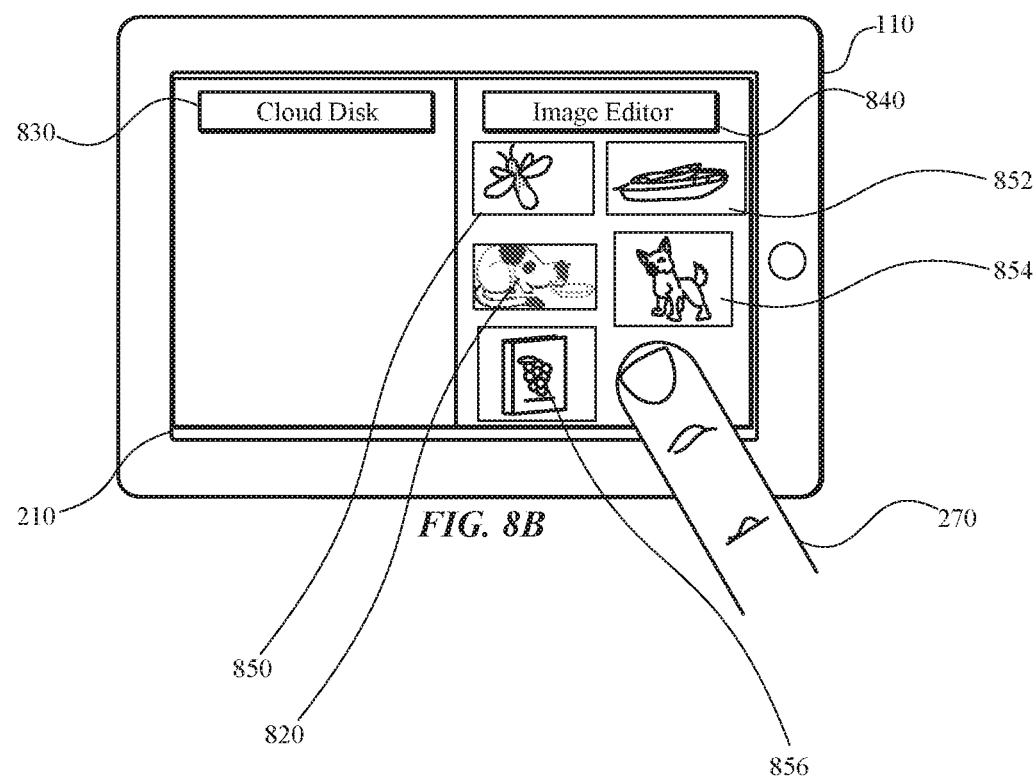

FIGS. 8A-8B illustrate an drag and drop operation involving a collection view that is performed on an electronic device 110 that includes a touchscreen in accordance with one or more implementations. For explanatory purposes, the example drag and drop operation illustrated in FIGS. 8A-8B is described as being performed on the electronic device 110 of FIG. 1. However, the example drag and drop operation illustrated in FIGS. 8A-8B may be performed on any electronic device that includes a touchscreen.

As illustrated in FIG. 8A, the electronic device 110 may detect an initial touch input based on a user's finger 270 touching a touchscreen 210 of the electronic device 110. The electronic device 110 may determine that the user's finger 270 has selected an item 820 (e.g., an image) provided in a source application 830 (e.g., a cloud storage application or any application) to be part of a drag session for a drag and drop operation. A destination application 840 (e.g., an image editor application or any application) is provided in a split-screen view where both the source application 830 and destination application 840 are shown side by side on the touchscreen 210. As shown, the destination application 840 provides, in a collection view, items 850, 852, 854, and 856 corresponding to different images.

The electronic device 110 detects a drag gesture based on the user's finger 270 moving across the touchscreen 210 of the electronic device 110. The drag gesture may include moving the item 820 to a position within the collection view of items provided in the destination application 840. As illustrated in FIG. 8B, the electronic device 110 detects that the drag gesture is complete when the electronic device 110 detects that the user's finger 270 has been lifted from the touchscreen 210 of the electronic device 110.

Upon completion of the drag gesture, the item 820 has been moved from the source application 830 and inserted into the collection view of the destination application 840 with the items 850, 852, 854, and 856. In particular, the item 820 has been inserted in the same position as the item 854 was previously at in FIG. 8A, and the item 854 has been shift to the right to be in the same position as the item 856 was previously at in FIG. 8A. The item 856 has been moved to a new position in FIG. 8B below the rest of the other items. The drag session has now completed. In one or more implementations, when inserting the item into the collection view, the electronic device 110 may implement the state reconciliation of the process discussed below with respect to FIG. 9 in order to account for any changes in state between the time when the item was first moved over the destination application 840 until the time that the item was dropped into the collection view of the destination application 840.

Figure 9:
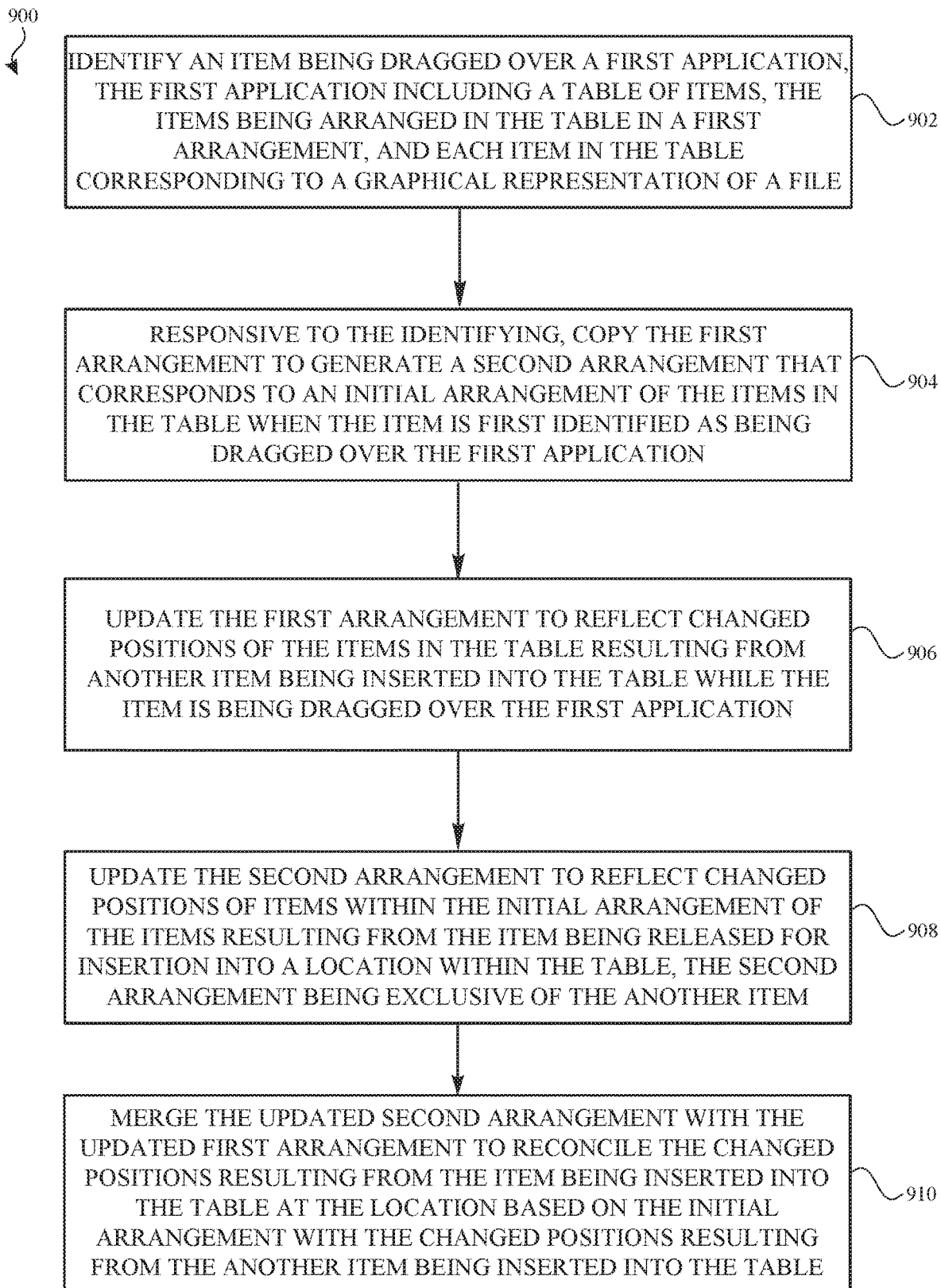
FIG. 9 illustrates a flow diagram of an example process for performing a drag and drop operation involving a table or collection view on an electronic device that includes a touchscreen in accordance with one or more implementations.

FIG. 9 illustrates a flow diagram of an example process 900 for performing a drag and drop operation involving a table/collection view on an electronic device that includes a touchscreen in accordance with one or more implementations. For explanatory purposes, the process 900 is primarily described herein with reference to the electronic device 110 of FIGS. 1 and 2, particularly with reference to the drag and drop manager 310 described above in FIG. 3. However, the process 900 is not limited to the electronic device 110 of FIGS. 1 and 2, and one or more blocks (or operations) of the process 900 may be performed by one or more other components of other suitable devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The drag and drop manager 310 identifies an item being dragged over a first application, the first application including a table of items (or a collection of items), the items being arranged in the table in a first arrangement, and each item in the table corresponding to a graphical representation of a file (902). The drag and drop manager 310, responsive to the identifying, copies the first arrangement to generate a second arrangement that corresponds to an initial arrangement of the items in the table when the item is first identified as being dragged over the first application (904).

The drag and drop manager 310 updates the first arrangement to reflect changed positions of the items in the table resulting from, for example, another item being inserted into the table while the item is being dragged over the first application (906). For example, if a copy or download operation had previously been initiated with respect to the table view, additional items may be inserted as they are copied or downloaded, such as from the server 120. In one or more implementations, changed positions of the items may also result from, for example, an item being deleted from the table.

The drag and drop manager 310 updates the second arrangement to reflect changed positions of items within the initial arrangement of the items resulting from the item being released for insertion into a location within the table, the second arrangement being exclusive of the another item (908). For example, when the item is released for insertion into a location or position within the table, the positions of the items surrounding the insertion location may change to create space to insert the item.

The drag and drop manager 310 merges the updated second arrangement with the updated first arrangement to reconcile the changed positions resulting from the item being inserted into the table at the location based on the initial arrangement with the changed positions resulting from the another item being inserted into the table (910). In this manner, any updates to the table view that occurred during the drag session can be reconciled with the position where the item was inserted, e.g. based on the initial arrangement.

Figure 10:
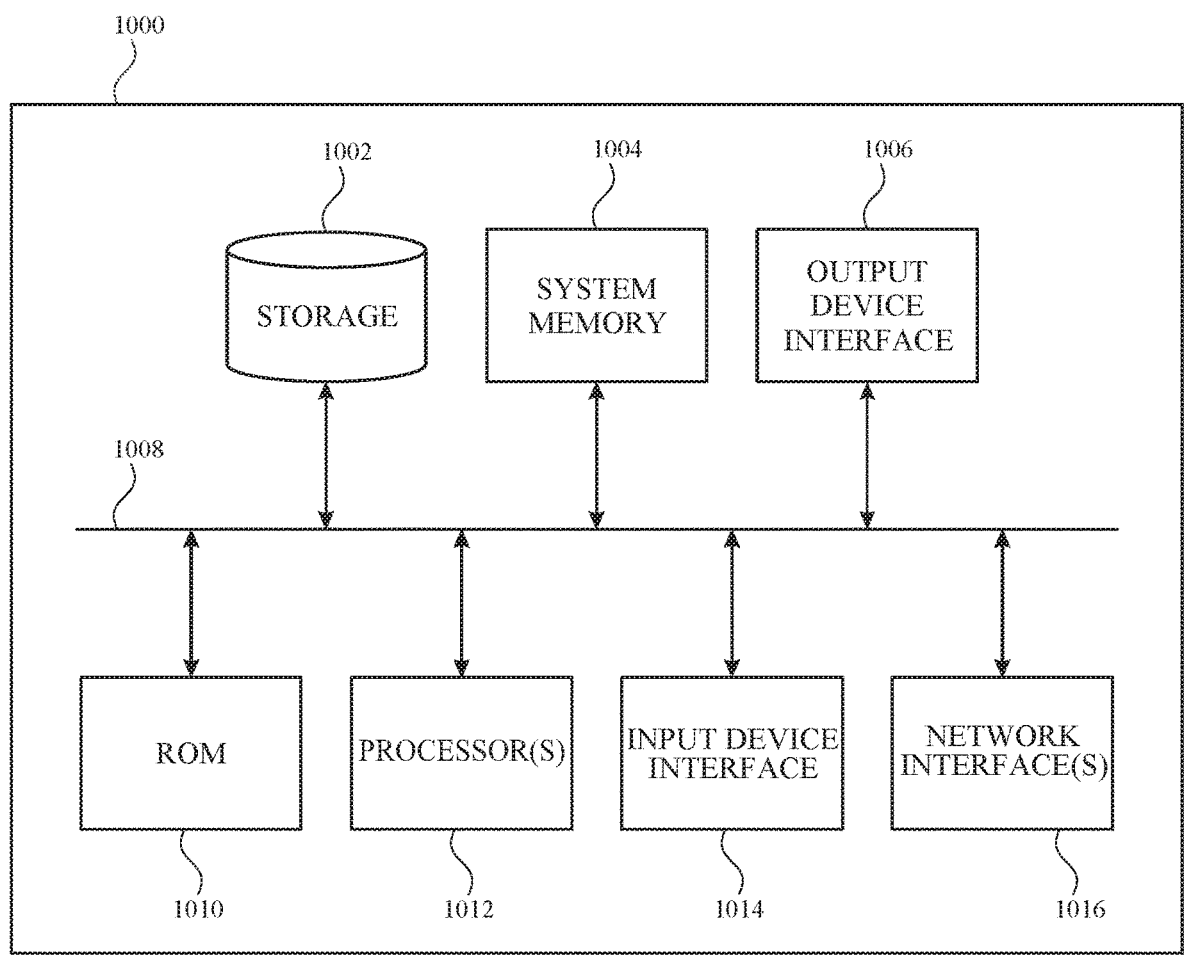
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 110, and/or the server 120 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 110 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items, By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising;

a processor;

a memory device containing instructions, which when executed by the processor cause the processor to provide:

a drag and drop manager configured to:
- manage a drag session corresponding to a drag event, the drag event including an initial touch input selecting an item in a first application, a drag gesture moving the item, and a touch release at an end of the drag gesture for dropping the item in a second application, wherein the drag session is assigned a drag session identifier, and the drag and drop manager is separate from the first application and the second application;
- receive, after the touch release, a request from the second application for information corresponding to the item associated with the drag event, the request including information corresponding to the drag session identifier; and
- send a message including the information corresponding to the item to the second application; and a touch event manager configured to:
- receive a request from the drag and drop manager to generate a copy of the drag event in a form of a specialized drag event that coexists with the drag event to provide to the drag and drop manager, wherein the drag and drop manager is further configured to manage the specialized drag event and receive new drag touches for the drag session; and
- determine, using a new touch input during the drag session, whether the second application is to receive the item from the drag event.

2. The device of claim 1, wherein the message including the information corresponding to the item comprises a list of representations of the item, each of the representations being provided by the first application, and the list of representations is ordered based at least in part on a quality level associated with each of the representations.

3. The device of claim 2, wherein the touch event manager is further configured to forward the new touch input to the second application, the new touch input including an indication of the drag session identifier.

4. The device of claim 1, wherein the drag and drop manager is further configured to prevent the item from being dropped into the second application when the drag and drop manager determines that the second application is not authorized to receive the item.

5. The device of claim 1, wherein to determine, using the new touch input during the drag session, whether the second application is to receive the item from the drag event further comprises determining whether a location of the new touch input intersects with a user interface corresponding to the second application.

6. The device of claim 5, wherein determining whether the location of the new touch input intersects with the user interface corresponding to the second application further comprises:
- determining a centroid of respective locations of the new touch input and prior touch inputs associated with the drag session identifier to determine whether the second application corresponds to a destination application for the drag event.

7. The device of claim 1, wherein the drag and drop manager is further configured to forward touch inputs associated with the drag session identifier to the touch event manager via interprocess communication.

8. The device of claim 1, wherein the drag and drop manager is further configured to receive a notification indicating an end of the drag gesture.

9. The device of claim 8, wherein the drag and drop manager is further configured to notify the second application to indicate that the drag gesture has ended and that the item is to be dropped into the second application.

10. The device of claim 1, wherein the touch event manager is further configured to:
- associate a new unique identifier with a touch path of the drag event;
- verify, using the new unique identifier, that newly received touch inputs that are part of the drag event match previous touch inputs of the drag event; and
- forward touch inputs flagged with the drag session identifier to the drag and drop manager, the first application, or the second application.

11. A method comprising:
- managing, by a drag and drop manager, a drag session corresponding to a drag event, the drag event including an initial touch input selecting an item in a first application, a drag gesture moving the item, and a touch release at an end of the drag gesture for dropping the item in a second application, wherein the drag session is assigned a drag session identifier, and the drag and drop manager is separate from the first application and the second application;
- receiving a request to generate a copy of the drag event in a form of a specialized drag event that coexists with the drag event for the drag session;
- receiving, after the touch release, a request from the second application for information corresponding to the item associated with the drag event, the request including information corresponding to the drag session identifier; and
- sending a message including the information corresponding to the item to the second application, the information having been received from the first application.

12. The method of claim 11, further comprising:
- determining, using a new touch input during the drag session, whether the second application is to receive the item from the drag event.

13. The method of claim 11, wherein the message including the information corresponding to the item comprises a list of representations of the item, each of the representations being provided by the first application.

14. The method of claim 13, wherein the list of representations is ordered based at least in part on a quality level associated with each of the representations.

15. The method of claim 12, wherein determining, using the new touch input during the drag session, whether the second application is to receive the item from the drag event further comprises determining whether a location of the new touch input intersects with a user interface corresponding to the second application.

16. The method of claim 15, wherein determining whether the location of the new touch input intersects with the user interface corresponding to the second application further comprises:
- determining a centroid of respective locations of the new touch input and prior touch inputs associated with the drag session identifier to determine whether the second application corresponds to a destination application for the drag event.

17. The method of claim 11, further comprising:
- receiving a notification indicating an end of the drag gesture.

18. The method of claim 17, further comprising:
notifying the second application to indicate that the drag gesture has ended and that the item is to be dropped into the second application.

19. A computer program product comprising code stored in a non-transitory computer-readable storage medium, the code comprising:
- code to manage, by a drag and drop manager, a drag session corresponding to a drag event, the drag event including an initial touch input selecting an item in a first application, a drag gesture moving the item, and a touch release at an end of the drag gesture for dropping the item in a second application, wherein the drag session is assigned a drag session identifier, and the drag and drop manager is separate from the first application and the second application;
- code to receive a request to generate a copy of the drag event in a form of a specialized drag event that coexists with the drag event for the drag session;
- code to receive, after the touch release, a request from the second application for information corresponding to the item associated with the drag event, the request including information corresponding to the drag session identifier; and
- code to send a message including the information corresponding to the item to the second application, the information having been received from the first application.

20. The computer program product of claim 19, wherein the code further comprises:
- code to determine, using a new touch input during the drag session, whether the second application is to receive the item from the drag event.

21. The computer program product of claim 19, wherein the message is not sent to the second application when the second application is not authorized to receive the item.

* * * * *